United States Patent
Tokutake et al.

(10) Patent No.: US 10,389,867 B2
(45) Date of Patent: Aug. 20, 2019

(54) INFORMATION PROCESSING DEVICE AND INFORMATION PROCESSING METHOD FOR CONTROLLING A TRANSITION BETWEEN A LOCK SCREEN AND AN UNLOCKED RETURN SCREEN

(71) Applicant: SONY MOBILE COMMUNICATIONS INC., Tokyo (JP)

(72) Inventors: Kenji Tokutake, Kanagawa (JP); Yuka Jingushi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/785,524

(22) Filed: Oct. 17, 2017

(65) Prior Publication Data

US 2018/0124232 A1 May 3, 2018

(30) Foreign Application Priority Data

Nov. 2, 2016 (JP) .................. 2016-215333

(51) Int. Cl.
*H04M 1/66* (2006.01)
*H04M 1/725* (2006.01)
(Continued)

(52) U.S. Cl.
CPC ...... *H04M 1/72577* (2013.01); *G06F 3/0488* (2013.01); *G06F 21/31* (2013.01); *H04L 63/0861* (2013.01); *H04W 12/06* (2013.01)

(58) Field of Classification Search
CPC .... H04L 63/08; H04L 63/0861; H04W 12/06; H04W 12/08; H04W 12/12; H04W 88/02; H04M 1/72577
See application file for complete search history.

(56) References Cited

U.S. PATENT DOCUMENTS

| | | | |
|---|---|---|---|
| 8,539,382 B2 * | 9/2013 | Lyon | G06F 3/0488 455/411 |
| 9,922,347 B1 * | 3/2018 | Burcham | G06Q 30/0269 |

(Continued)

FOREIGN PATENT DOCUMENTS

EP 2 801 893 A1 11/2014
EP 2 866 165 A1 4/2015
(Continued)

OTHER PUBLICATIONS

Extended European Search Report dated Feb. 28, 2018 in Patent Application No. 17196895.1, 6 pages.

*Primary Examiner* — Khoi H Tran
*Assistant Examiner* — B M M Hannan
(74) *Attorney, Agent, or Firm* — Xsensus LLP

(57) ABSTRACT

An information processing device for enabling the user to enjoy both the benefits of authentication and the conveniences of the lock screen, including processing circuitry that acquires authentication information and operation information, controls a display on a basis of the authentication information or the operation information, causes a lock screen to be displayed, causes an unlocked return screen to be displayed in a case in which an authentication process is successful, controls a transition from the lock screen to the unlocked return screen, continues to cause a transition screen to be displayed, and cancels the transition from the lock screen to the unlocked return screen and causes the lock screen to be displayed again in a case in which second operation information is obtained while the transition screen is being displayed.

18 Claims, 22 Drawing Sheets

(51) Int. Cl.
  *H04L 29/06*    (2006.01)
  *H04W 12/06*    (2009.01)
  *G06F 3/0488*   (2013.01)
  *G06F 21/31*    (2013.01)

(56) References Cited

U.S. PATENT DOCUMENTS

| | | | |
|---|---|---|---|
| 2011/0102345 A1* | 5/2011 | Kim | G06F 3/04883 |
| | | | 345/173 |
| 2013/0111395 A1* | 5/2013 | Ying | G06F 3/0483 |
| | | | 715/783 |
| 2015/0046885 A1 | 2/2015 | Zhang et al. | |
| 2015/0067365 A1 | 3/2015 | Nakazima et al. | |
| 2015/0074615 A1* | 3/2015 | Han | G06K 9/00033 |
| | | | 715/863 |
| 2015/0116218 A1 | 4/2015 | Yang et al. | |
| 2015/0331401 A1* | 11/2015 | Yokoi | G05B 15/02 |
| | | | 700/83 |

FOREIGN PATENT DOCUMENTS

| | | |
|---|---|---|
| JP | 2015-45902 | 3/2015 |
| KR | 10-2016-0016432 A | 2/2016 |

\* cited by examiner

INFORMATION PROCESSING DEVICE AND INFORMATION PROCESSING METHOD FOR CONTROLLING A TRANSITION BETWEEN A LOCK SCREEN AND AN UNLOCKED RETURN SCREEN

CROSS REFERENCE TO RELATED APPLICATIONS

This application claims the benefit of Japanese Priority Patent Application JP 2016-215333 filed Nov. 2, 2016, the entire contents of which are incorporated herein by reference.

BACKGROUND

The present disclosure relates to an information processing device and an information processing method.

Recently, a variety of terminal devices are in circulation, such as smartphones and watch-style activity meters. Due to circumstances such as increasingly advanced functionality of terminal devices and the expansion of Web services and the like via terminal devices, there is a tendency for greater amounts of personal information to be stored in terminal devices, and the security functions of terminal devices are being taken seriously. For this reason, in recent years, the development of authentication technology, including biometric authentication, is flourishing. Authentication technology is approaching maturity with a central focus on fingerprint authentication, and at present is entering a stage in which improvements in authentication performance (authentication rate, low power consumption, or authentication speed) and better usability are being pursued.

At this point, smartphones have had lock screens as a function of maintaining security prior to the proliferation of biometric authentication. A lock screen is a screen that conducts authentication with a factor such as a personal identification number (PIN) or a keystroke pattern, and is a screen whose primary purpose is to prevent operation by other people. However, due to the characteristics of the lock screen, the functions of a user interface (UI) displayed first after the screen is turned on are being added to the lock screen. Such functions include, for example, the display of a clock that is easier to see than a clock arranged on a home screen, notification information such as newly received messages, and the arrangement of widgets such as a music controller. In this way, the role of the lock screen is being redefined not only as an element for ensuring security, but also as a place where important information can be checked and operations can be performed easily.

Note that as a technology related to switching the display of a screen on/off, JP 2015-45902A discloses a technology for a tablet personal computer (PC) that executes processes such as receiving mail and updating data while the tablet PC is sleeping, while also preventing a transition to an operational state.

SUMMARY

Recently, technological improvements such as improved processing speed and improved usability related to authentication are advancing, and there is a trend of excessive shortening of the interval from when the user turns on the screen and the lock screen is displayed, until when the authentication process is completed and the home screen is displayed, for example. For this reason, it is starting to become difficult for the user to display the lock screen without proceeding to the home screen after turning on the screen, and thus it is becoming difficult for the user to enjoy the conveniences of the lock screen, such as checking important information and performing operations easily. On the other hand, slowing down the authentication speed is inappropriate.

Accordingly, the present disclosure proposes a mechanism enabling the user to enjoy both the benefits of improved technology related to authentication and the conveniences of the lock screen.

According to the present disclosure, there is provided an information processing device, including: an acquisition unit that acquires authentication information and operation information; and a display control unit that controls a display on a basis of the authentication information or the operation information acquired by the acquisition unit. The display control unit causes a lock screen to be displayed in a case in which certain operation information is acquired while an initial screen is being displayed, causes an unlocked return screen to be displayed in a case in which an authentication process based on the authentication information is successful, and controls, on a basis of the operation information, a transition from the lock screen to the return screen conducted in accordance with the authentication process.

Further, according to the present disclosure, there is provided an information processing device, including: an acquisition unit that acquires authentication information and operation information; and a display control unit that controls a display on a basis of the authentication information or the operation information acquired by the acquisition unit. The display control unit causes a lock screen to be displayed in a case in which certain operation information is acquired while an initial screen is being displayed, causes an unlocked return screen to be displayed in a case in which the authentication information indicating that authentication is successful is acquired, and causes an image based on the lock screen to be displayed on the return screen.

Further, according to the present disclosure, there is provided an information processing method, including: acquiring authentication information and operation information; and controlling a display with a processor on a basis of the acquired authentication information or the acquired operation information. The controlling of the display includes causing a lock screen to be displayed in a case in which certain operation information is acquired while an initial screen is being displayed, causing an unlocked return screen to be displayed in a case in which an authentication process based on the authentication information is successful, and controlling, on a basis of the operation information, a transition from the lock screen to the return screen conducted in accordance with the authentication process.

Further, according to the present disclosure, there is provided an information processing method, including: acquiring authentication information and operation information; and controlling a display with a processor on a basis of the acquired authentication information or the acquired operation information. The controlling of the display includes causing a lock screen to be displayed in a case in which certain operation information is acquired while an initial screen is being displayed, causing an unlocked return screen to be displayed in a case in which the authentication information indicating that authentication is successful is acquired, and causing an image based on the lock screen to be displayed on the return screen.

According to an embodiment of the present disclosure as described above, there is proposed a mechanism enabling the user to enjoy both the benefits of improved technology related to authentication and the conveniences of the lock screen. Note that the effects described above are not necessarily limitative. With or in the place of the above effects, there may be achieved any one of the effects described in this specification or other effects that may be grasped from this specification.

DETAILED DESCRIPTION OF THE EMBODIMENT(S)

Figure 1:
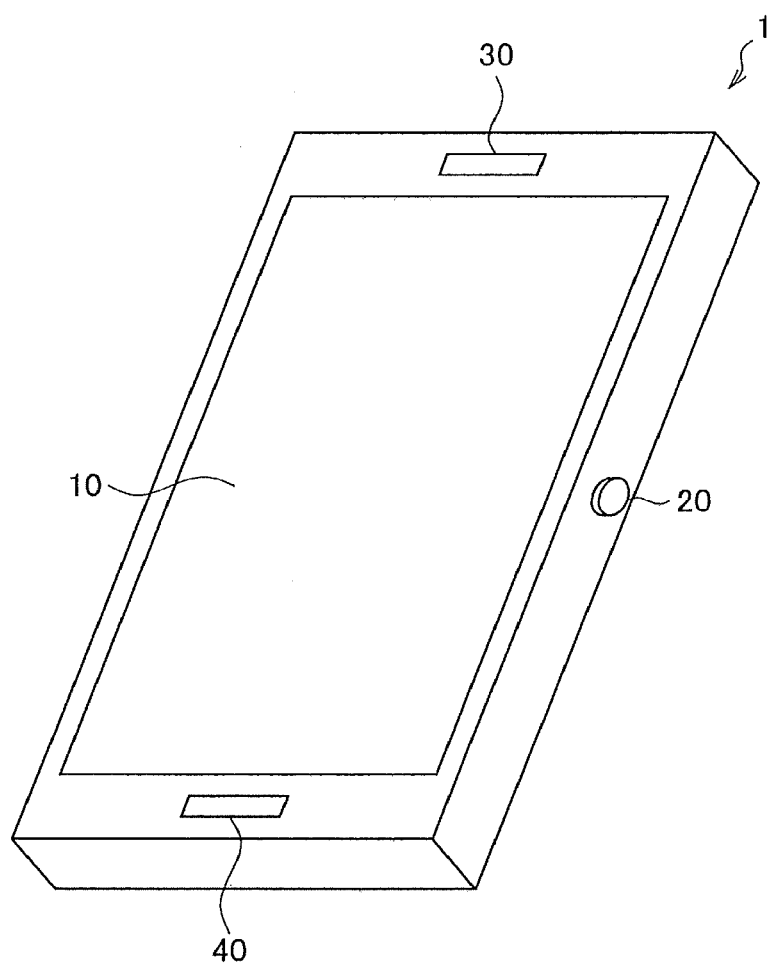
FIG. 1 is a diagram for explaining an example of an exterior configuration of a terminal device according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Hereinafter, the description will proceed in the following order.

1. Exemplary configuration
2. Basic UI example
3. First embodiment
   3.1. Cancel operation
   3.2. Transition control in accordance with user operation
4. Second embodiment
   4.1. UI element transfer
   4.2. Reduced image of lock screen
5. Third embodiment
6. Exemplary hardware configuration
7. Conclusion 1. Exemplary Configuration First, an exemplary configuration of an information processing device according to an embodiment of the present disclosure will be described with reference to FIGS. 1 to 3.

FIG. 1 is a diagram for explaining an example of an exterior configuration of an information processing device according to the present embodiment. As illustrated in FIG. 1, the information processing device may be realized as a terminal device 1 (specifically, a smartphone) including a touch panel 10, a power key 20, a speaker 30, and a microphone 40.

The touch panel 10 displays an image (that is, a UI), while also accepting user operations such as touch operations performed on the UI.

The power key 20 accepts an operation of switching the power on/off, or switching the display by the touch panel 10 on/off. The power key 20 may also include a function to act as a fingerprint sensor. For example, the power key 20 is realized as a capacitive sensor, and on the basis of the electrostatic capacitance when a finger touches the power key 20, the power key 20 is able to detect operations such as a tap, a double tap, or a press, and is also able to detect a fingerprint.

The speaker 30 includes a function of outputting sound, while the microphone 40 includes a function of inputting sound. Typically, when the user makes telephone calls using the terminal device 1, the speaker 30 reproduces the voice of the person on the other side of the call, while the microphone 40 picks up the user's voice.

The above thus describes an exterior configuration of the terminal device 1. Next, an internal configuration of the terminal device 1 will be described with reference to FIG. 2.

Figure 2:
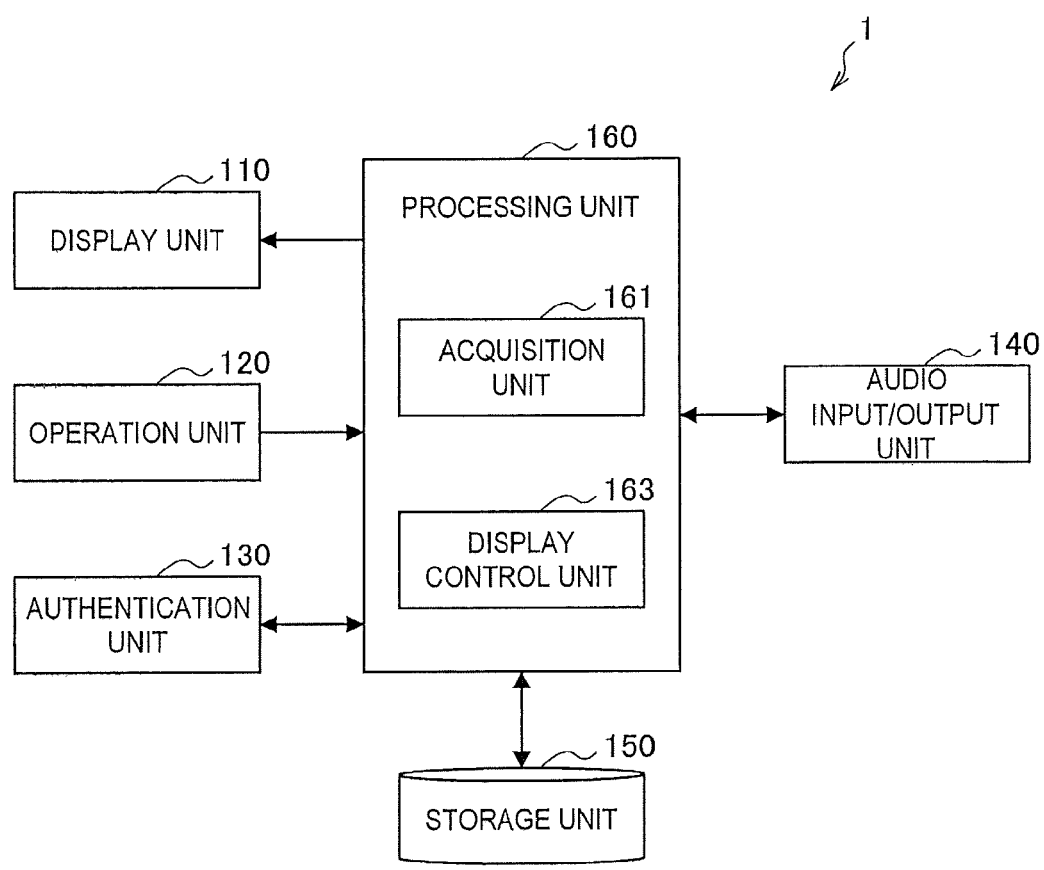
FIG. 2 is a block diagram for explaining an example of an internal configuration of a terminal device according to an embodiment.

FIG. 2 is a block diagram for explaining an example of an internal configuration of the terminal device 1 according to the present embodiment. As illustrated in FIG. 2, the terminal device 1 includes a display unit 110, an operation unit 120, an authentication unit 130, an audio input/output unit 140, a storage unit 150, and a processing unit 160.

The display unit 110 includes a function of displaying images (still images/moving images). The display unit 110 displays images under control by the processing unit 160.

The display unit 110 is realized with a component such as a liquid crystal display (LCD) or an organic light-emitting diode (OLED) display, for example.

The operation unit 120 includes a function of accepting user operations. The operation unit 120 outputs operation information, which is information indicating an accepted user operation, to the processing unit 160. The operation unit 120 may be realized by components such as one or more buttons and keys, a jog dial, or a touchpad. As illustrated in FIG. 1, the operation unit 120 may also be integrated with the display unit 110 to form the touch panel 10. Also, as illustrated in FIG. 1, the operation unit 120 may also be formed as the power key 20, and may detect operations such as a tap, a double tap, or a press on the power key 20.

The authentication unit 130 includes a function of conducting an authentication process on the basis of authentication information. For example, the authentication information may include biometric information such as a fingerprint, hand geometry, veins, iris, retina, face, voice, or ear geometry. Also, the authentication information may include user action information such as handwriting or keystrokes. Also, the authentication information may include device information about a device such as an activity meter or an Internet of Things (IoT) device carried by the user. The authentication unit 130 starts the authentication process when triggered by the detection of authentication information. Subsequently, the authentication unit 130 outputs information indicating an authentication result to the processing unit 160. Note that the authentication unit 130 may also output authentication information to the processing unit 160, and the processing unit 160 may conduct the authentication process. In the example illustrated in FIG. 1, the authentication unit 130 includes the power key 20, and conducts the authentication process on the basis of fingerprint information detected by the power key 20.

The audio input/output unit 140 includes a function of accepting the input of audio, and a function of outputting audio. The audio input/output unit 140 outputs input audio information to the processing unit 160, and outputs audio under control by the processing unit 160. As illustrated in FIG. 1, the audio input/output unit 140 may be formed as the speaker 30 and the microphone 40.

The storage unit 150 includes a function of temporarily or permanently storing information for the operation of the terminal device 1.

The processing unit 160 functions as a computational processing device and a control device, and includes a function of controlling overall operation inside the terminal device 1 by following various programs. As illustrated in FIG. 2, the processing unit 160 includes an acquisition unit 161 and a display control unit 163. The acquisition unit 161 includes a function of acquiring authentication information and operation information. The display control unit 163 includes a function of controlling the display on the basis of at least one of authentication information and operation information acquired by the acquisition unit 161. Note that in the following, the action of the display control unit 163 causing the display unit 110 to display an image will also be referred to as the terminal device 1 displaying an image. Specific display examples will be described in detail later. Note that the processing unit 160 may additionally include other structural elements besides the above structural elements. In other words, the processing unit 160 may also perform operations besides the operations performed by the above structural elements.

The above thus describes an internal configuration of the terminal device 1. Next, programs that run on the terminal device 1 will be described with reference to FIG. 3.

Figure 3:
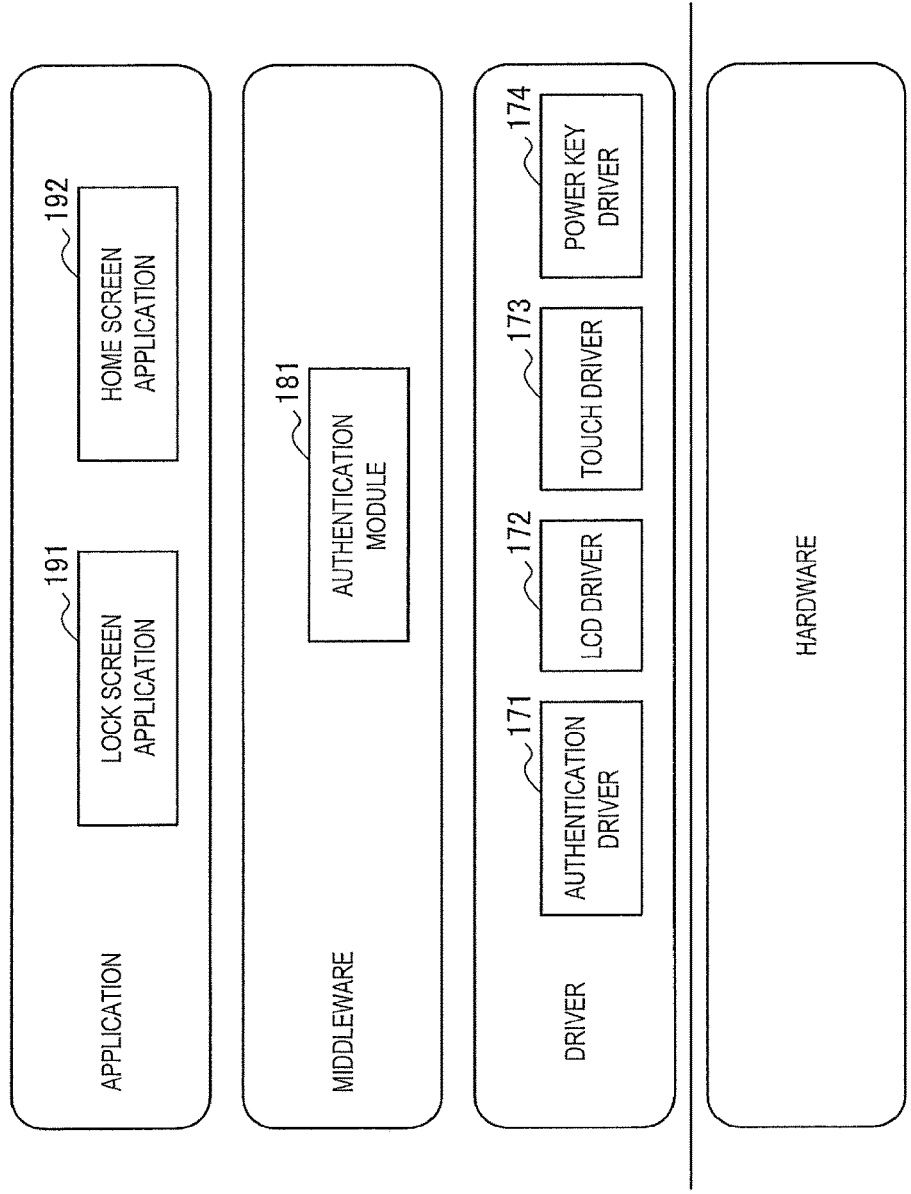
FIG. 3 is a diagram illustrating an example of programs that run on a terminal device according to an embodiment.

FIG. 3 is a diagram illustrating an example of programs that run on the terminal device according to the present embodiment. As illustrated in FIG. 3, drivers that provide an interface with hardware, middleware that provides a more advanced interface, and applications that provide various UIs run on the terminal device 1.

The drivers include an authentication driver 171, an LCD driver 172, a touch driver 173, and a power key driver 174. The authentication driver 171 provides an interface with hardware for the authentication process (such as a fingerprint sensor that detects biometric information, a touch sensor that detects action information, and a wireless communication device that detects device information, for example). Note that the authentication driver related to biometric information may also be called a biometric authentication sensor driver. The LCD driver 172 provides an interface with hardware (for example, an LCD) that realizes the display function of the touch panel 10. The touch driver 173 provides an interface with hardware that realizes the operation-accepting function of the touch panel 10. The power key driver 174 provides an interface with hardware that realizes the function of detecting an operation on the power key 20.

The middleware includes an authentication module 181. For example, the authentication module 181 conducts an authentication process on the basis of information obtained from the authentication driver 171.

The applications include a lock screen application 191 and a home screen application 192. The lock screen application 191 is an application that displays a lock screen and a transition screen. The home screen application 192 is an application for displaying a home screen.

2. Basic UI Example

Hereinafter, a basic UI example will be described with reference to FIGS. 4 and 5.

Figure 4:
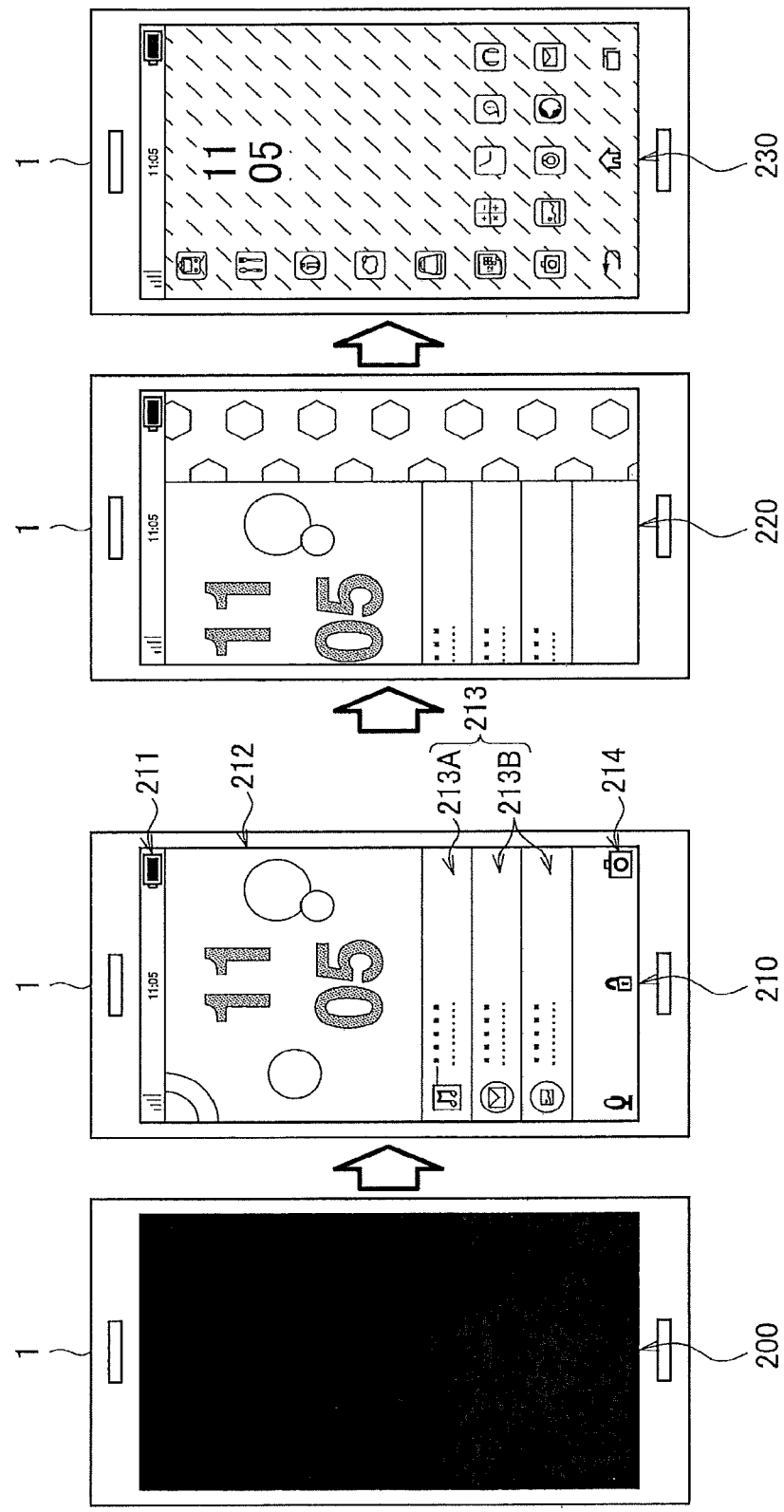
FIG. 4 is a diagram for explaining an example of UI transitions in a terminal device according to an embodiment.
Figure 5:
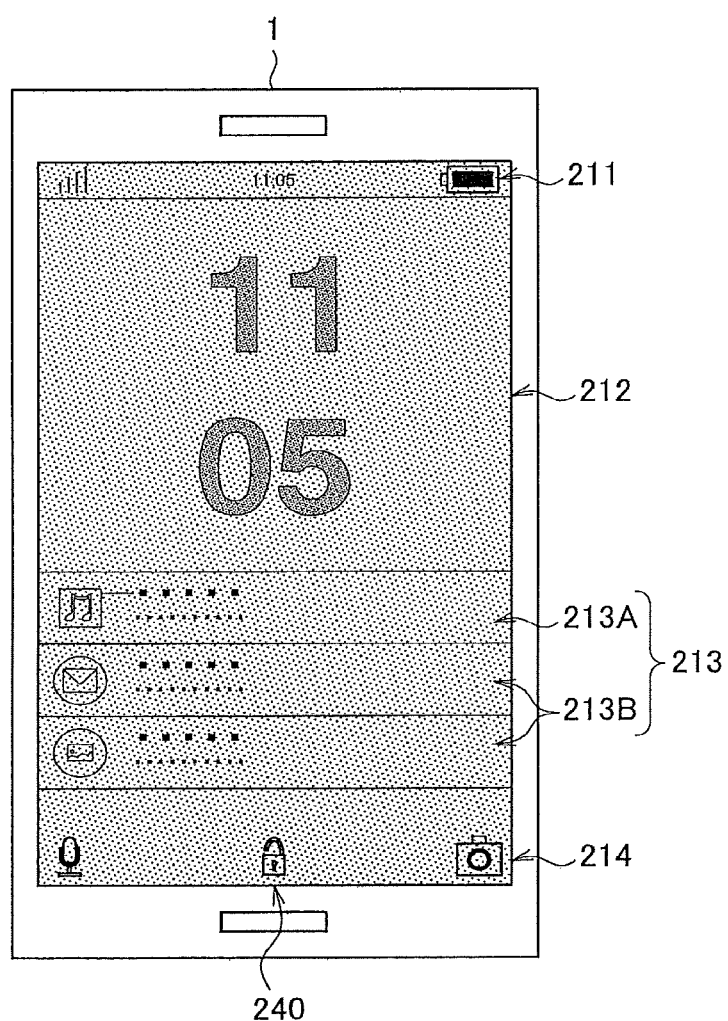
FIG. 5 is a diagram for explaining an example of an ambient screen according to an embodiment.

FIG. 4 is a diagram for explaining an example of UI transitions in the terminal device 1 according to the present embodiment. As illustrated in FIG. 4, the terminal device 1 may cause the UI to transition from an initial screen 20, to a lock screen 210, to a transition screen 220, and to a home screen 230, in that order, in response to a user operation.

The lock screen 210 is a screen that accepts a user operation for authentication or the like, while locking out (that is, not accepting) any other user operations. Also, on the lock screen 210, it is also possible to check important information and perform operations easily. For example, in the example illustrated in FIG. 4, information such as the signal reception and remaining battery level is displayed in a header region 211, a background image including a clock is displayed in a background region 212, a widget 213 is displayed overlaid onto the background region 212, and in addition, operation keys 214 are displayed. The widget 213 is a UI element that provides an interface of an application running on the terminal device 1, and in the example illustrated in FIG. 4, includes a music controller 213A and notification information 213B. Without conducting authentication, the user is able to perform music-related operations with the music controller 213A, and check the content of the notification information 213B reported from an application. By using the operation keys 214, the user is able to perform certain operations, such as taking a photo, for example.

The initial screen 200 is the screen from which the display transitions to the lock screen 210. The terminal device 1 displays the lock screen 210 in a case in which certain operation information is acquired while the initial screen 200 is being displayed. For example, the initial screen 200 transitions to the lock screen 210 in a case in which the power key 20 is tapped or pressed. As illustrated in FIG. 4, the initial screen 200 may also be the screen when the display is turned off or the screen while the display is sleeping (for example, a completely black screen). Otherwise, the initial screen 200 may also be an ambient screen. FIG. 5 is a diagram for explaining an example of an ambient screen according to the present embodiment. As illustrated in FIG. 5, an ambient screen 240 is a screen that displays UI elements similar to the lock screen 210 (in other words, the header region 211, the background region 212, the widget 213, and the operation keys 214). However, on the ambient screen 240, a simple image such as a completely black image is displayed as the background image, information is displayed in a single color, or the like, and thus the power consumption is low compared to the lock screen 210.

The home screen 230 is an example of a return screen which is displayed in a case in which authentication is successful on the lock screen 210. In the case in which the authentication process based on authentication information is successful, the terminal device 1 displays the return screen which is unlocked, or in other words, which allows various types of user operations. As illustrated in FIG. 4, the return screen may be a home screen 230 on which are arranged icons for launching applications. Otherwise, the return screen may also be an application screen that was being displayed before the display was turned off.

The transition screen 220 is a screen that indicates an ongoing transition from the lock screen 210 to the home screen 230, and is a screen which is displayed during the transition from the lock screen 210 to the home screen 230. Typically, the transition screen 220 starts being displayed at the timing when the authentication process is started. On the transition screen 220, typically an animation (that is, a moving image) is displayed. This animation may proceed in accordance with how far the authentication process has proceeded.

The above thus describes a basic UI. Hereinafter, respective embodiments will be described in order.

3. First Embodiment

In the present embodiment, the terminal device 1 controls the transition from the lock screen 210 to the home screen 230 conducted in accordance with the authentication process, on the basis of operation information. For example, the terminal device 1 may accept a cancel operation that cancels the transition from the lock screen 210 to the home screen 230. Additionally, the terminal device 1 may also control whether or not to start the transition from the lock screen 210 to the home screen 230, in accordance with a user operation. These features will be described in detail below.

<3.1. Cancel Operation>

The terminal device 1 accepts a cancel operation while the transition screen 220 is being displayed. First, UI transitions related to such a feature will be described with reference to FIG. 6.

Figure 6:
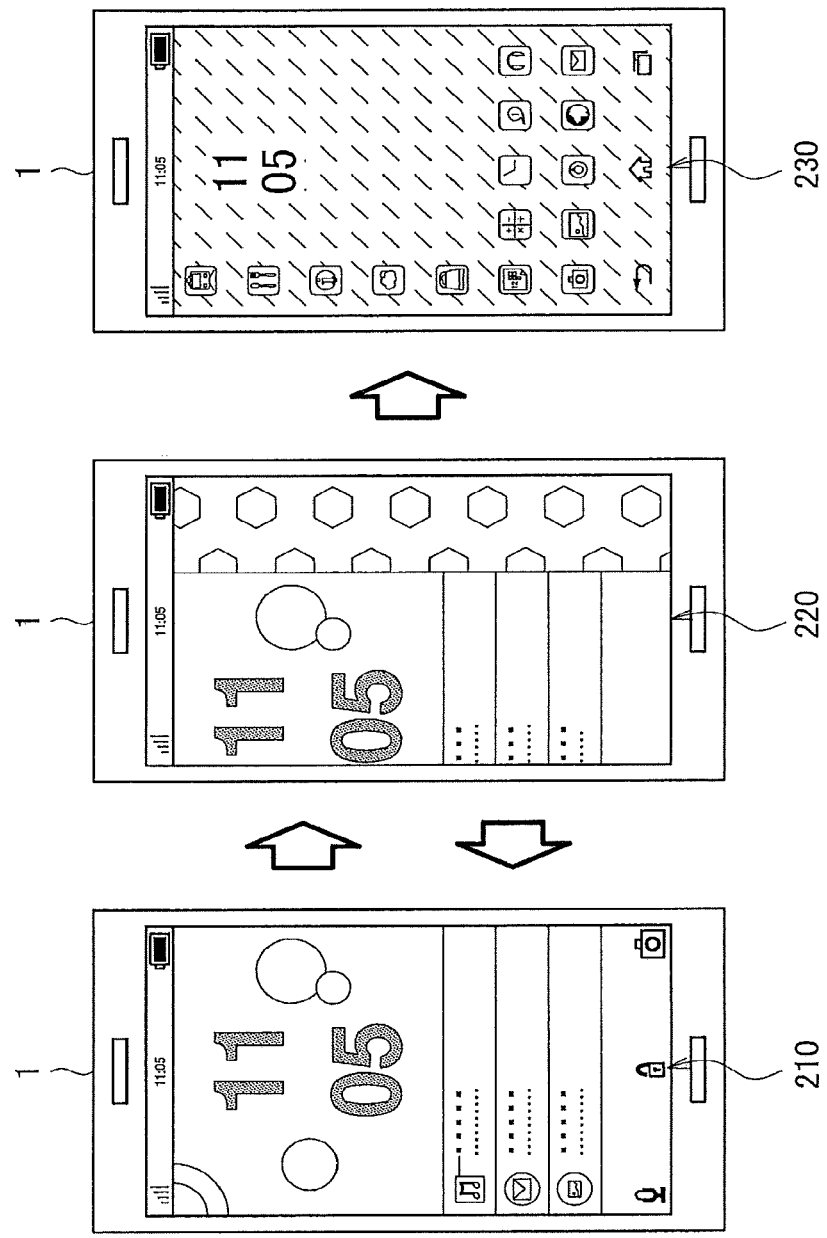
FIG. 6 is a diagram for explaining an example of UI transitions in a terminal device according to a first embodiment.

FIG. 6 is a diagram for explaining an example of UI transitions in the terminal device 1 according to the present embodiment. As illustrated in FIG. 6, after displaying the lock screen 210, the terminal device 1 displays the transition screen 220, and displays the home screen 230. However, in a case in which a cancel operation is performed while the transition screen 220 is being displayed, the terminal device 1 cancels the transition to the home screen 230, and displays the lock screen 210 again.

In particular, the terminal device 1 secures enough time to enable the user to perform the cancel operation naturally as the period of accepting the cancel operation. Specifically, the terminal device 1 continues to display the transition screen 220 during the execution period of the authentication process and another period continuous with the execution period, and displays the lock screen 210 in a case in which certain operation information is obtained while the transition screen 220 is being displayed. For example, in a case of displaying the transition screen 220 when triggered by the start of the authentication process, the terminal device 1 continues to display the transition screen 220 in parallel with the authentication process and even after the end of the authentication process. In this case, the terminal device 1 continues to display the transition screen 220 even if the authentication process has completed. Otherwise, the terminal device 1 may also display the transition screen 220 before the start of the authentication process. Additionally, in a case in which the cancel operation is performed while the transition screen 220 is being displayed, the terminal device 1 displays the lock screen 210 again. In this way, the terminal device 1 displays the transition screen 220 not only during the execution period of the authentication process, but also during a period in which the authentication process is not being conducted, thereby making it possible to secure the period of accepting the cancel operation, even in a case in which the execution period of the authentication process becomes excessively short. Consequently, the user becomes able to cancel the transition to the home screen 230 easily and cause the lock screen 210 to be displayed.

At this point, a variety of cancel operations is conceivable. For example, in a case in which the authentication process is fingerprint authentication based on a finger pressing the power key 20, the cancel operation may be an operation of releasing the finger from the power key 20. For example, in a case in which the authentication process is iris authentication, the cancel operation may be an operation of closing one's eyes. In this case, to avoid an incorrect determination that treats ordinary blinking as the cancel operation, it is desirable for the terminal device 1 to determine as the cancel operation an operation of closing one's eyes for 150 milliseconds or more, for example.

Stated from a quantitative perspective, the terminal device 1 displays the transition screen 220 for 500 milliseconds or more. This is because it typically takes approximately 500 milliseconds for the user to press a key and then perform a reverting action. Since the transition screen 220 is displayed for 500 milliseconds or more, the user becomes able to cancel the transition to the home screen 230 easily and cause the lock screen 210 to be displayed. Note that in a case in which fingerprint authentication takes approximately 300 milliseconds, for example, displaying the transition screen 220 for 500 milliseconds or more may also be treated as displaying the transition screen 220 for 200 milliseconds or more after the end of the authentication process.

The terminal device 1 may also control the display period of the transition screen 220. For example, the terminal device 1 may control the display period of the transition screen 220 in accordance with an operation history of the user. Specifically, the terminal device 1 lengthens the display period of the transition screen 220 for a user who is slow to take a reverting action after pressing the power key 20, and shortens the display period of the transition screen 220 for a user who is fast to take a reverting action after pressing the power key 20. With this arrangement, it becomes possible to provide ample opportunity to cancel the transition to the home screen 230, particularly for a user who is slow to take a reverting action after pressing the power key 20. Otherwise, the terminal device 1 may also control the display period of the transition screen 220 in accordance with arbitrary information such as position information or a time period. With this arrangement, it becomes possible to provide ample opportunity to cancel the transition to the home screen 230, even during time periods in which users tend to be slower in taking action, for example.

The terminal device 1 displays an animation on the transition screen 220. In a case of obtaining certain operation information indicating that a cancel operation has been performed, the terminal device 1 may display the lock screen 210 after reversing the animation that has proceeded so far.

Next, an example of the flow of a process related to a cancel operation will be described with reference to FIGS. 7 and 8.

Figure 7:
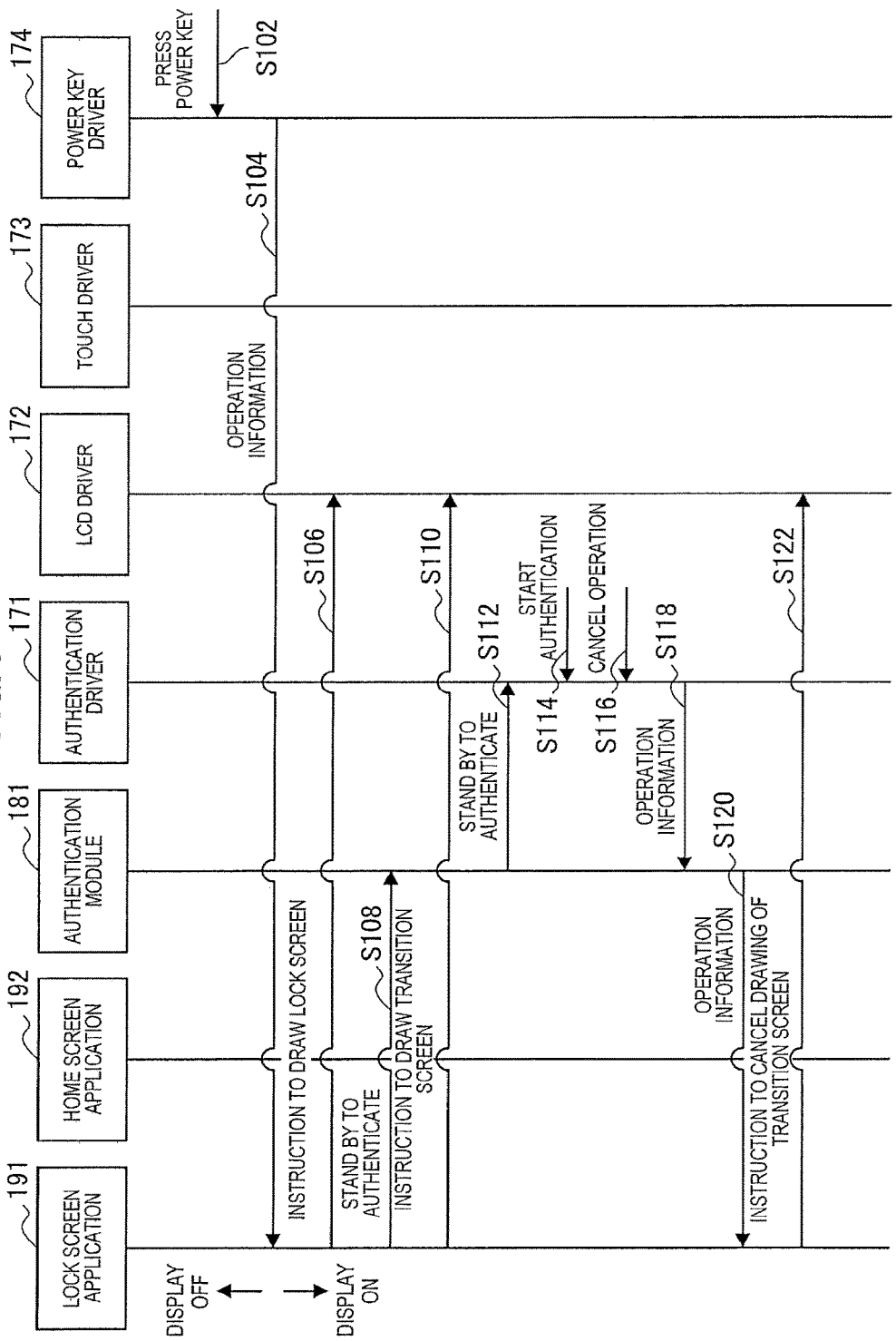
FIG. 7 is a sequence diagram illustrating an example of a flow of a display control process executed in a terminal device according to an embodiment.
Figure 8:
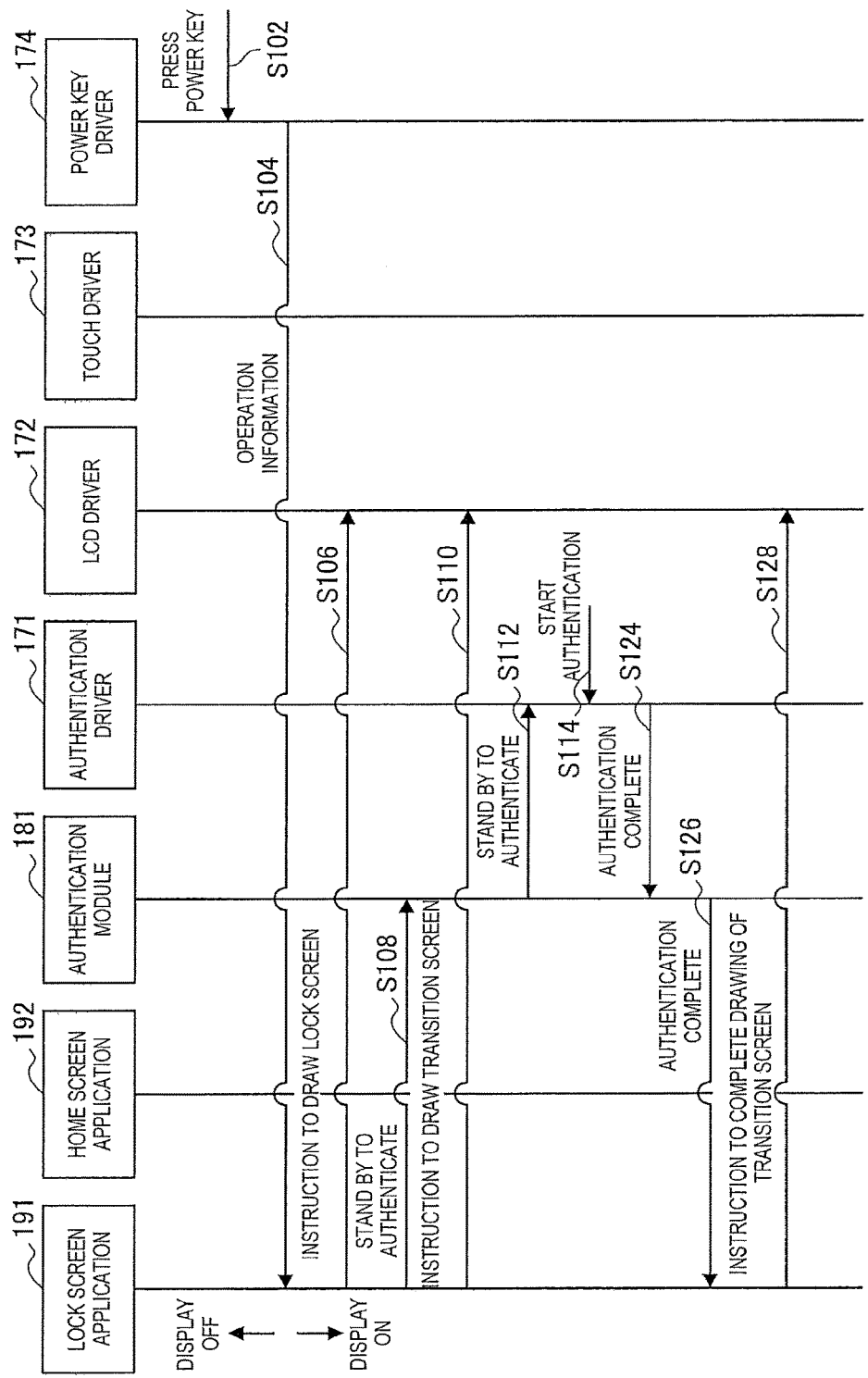
FIG. 8 is a sequence diagram illustrating an example of a flow of a display control process executed in a terminal device according to an embodiment.

FIGS. 7 and 8 are sequence diagrams illustrating examples of the flow of a display control process executed in the terminal device 1 according to the present embodiment. These sequences involve the lock screen application 191, the authentication module 181, the authentication driver 171, the LCD driver 172, and the power key driver 174.

Hereinafter, a case in which a cancel operation is performed while the transition screen 220 is being displayed will be described with reference to FIG. 7. First, the power key driver 174 detects an operation of pressing the power key 20 (step S102), and notifies the lock screen application 191 of operation information indicating that the power key 20 has been pressed (step S104). This notification acts as a trigger causing the state of the touch panel 10 to be switched from the display being off to the display being on. Subsequently, the lock screen application 191 issues an instruction to draw the lock screen 210 to the LCD driver 172, thereby causing the touch panel 10 to display the lock screen 210 (step S106). Next, the lock screen application 191 sets the authentication module 181 to an authentication standby state (step S108). Subsequently, the lock screen application 191 issues an instruction to draw the transition screen 220 to the LCD driver 172, thereby causing the touch panel 10 to display the transition screen 220 (step S110) Next, the authentication module 181 sets the authentication driver 171 to an authentication standby state (step S112). Subsequently, the authentication driver 171 starts the authentication process in a case of detecting authentication information (step S114). At this point, in a case in which fingerprint information is detected when the power key 20 is pressed, for example, step S102 and step S114 are executed on the basis of the single operation of pressing the power key 20.

Next, the authentication driver 171 detects that a cancel operation has been performed (step S116), and notifies the authentication module 181 of operation information indicating that the cancel operation has been performed (step S118). Subsequently, the authentication module 181 notifies the lock screen application 191 of operation information indicating that the cancel operation has been performed (step S120). In addition, the lock screen application 191 issues an instruction to cancel the drawing of the transition screen 220 to the LCD driver 172, thereby causing the touch panel 10 to cancel the display of the transition screen 220 (step S122) After that, the terminal device 1 displays the lock screen 210.

Hereinafter, a case in which a cancel operation is not performed while the transition screen 220 is being displayed will be described with reference to FIG. 8. Since the process according to steps S102 to S114 is as described above with reference to FIG. 7, repeated description will be omitted. If the authentication process is successful, the authentication driver 171 notifies the authentication module 181 of information indicating that authentication is complete (step S124). Subsequently, the authentication module 181 notifies the lock screen application 191 of information indicating that authentication is complete (step S126). In addition, the lock screen application 191 issues an instruction to complete the drawing of the transition screen 220 to the LCD driver 172, thereby causing the touch panel 10 to end the display of the transition screen 220 (step S128). After that, the terminal device 1 displays the home screen 230.

<3.2. Transition Control in Accordance with User Operation>

The terminal device 1 may also stop the transition on the lock screen 210, or continue the transition to the transition screen 220 and the home screen 230, in accordance with a user operation. First, a configuration whereby this feature is particularly useful will be described with reference to FIG. 9.

Figure 9:
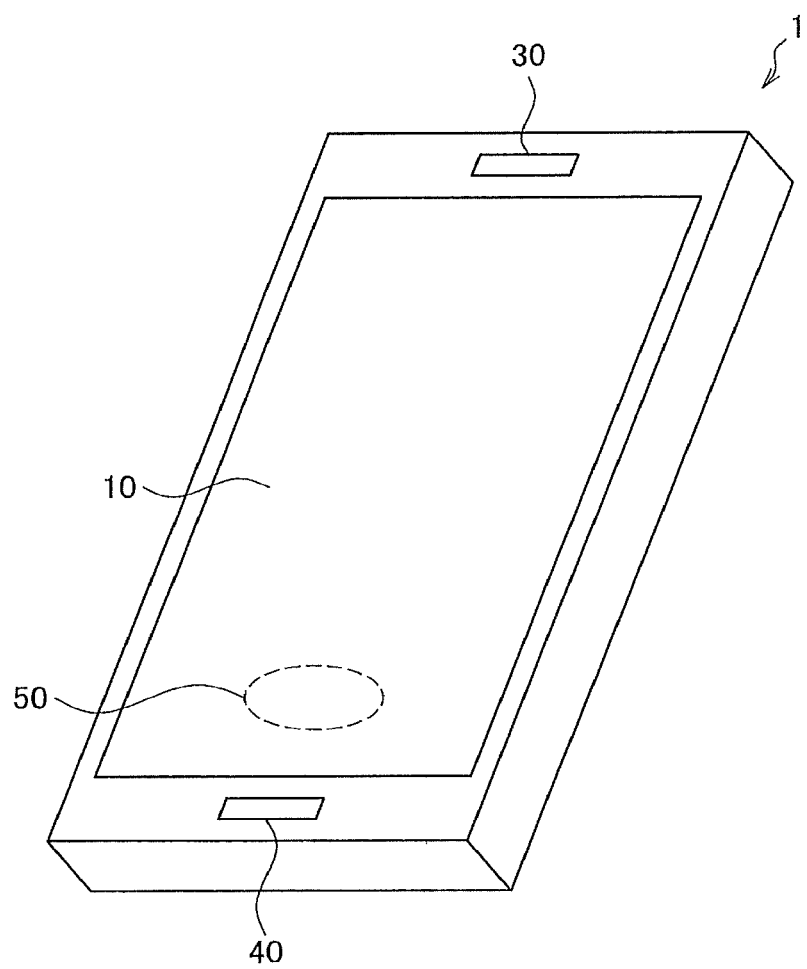
FIG. 9 is a diagram illustrating an example of an exterior configuration of a terminal device according to an embodiment.

FIG. 9 is a diagram illustrating an example of an exterior configuration of the terminal device 1 according to the present embodiment. As illustrated in FIG. 9, the terminal device 1 includes a touch panel 10, a speaker 30, a microphone 40, and a fingerprint sensor 50 provided underneath the touch panel 10. The fingerprint sensor 50 is able to detect fingerprint information on the basis of electrostatic capacitance, for example, without interfering with the display function and the user operation detection function provided by the touch panel 10. The method of configuring such a fingerprint sensor 50 is also called the under-glass method or the in-display method. Note that the fingerprint sensor 50 may be formed only in one region of the touch panel 10 as illustrated in FIG. 9, or over the entire region.

Since the power key 20 from the configuration illustrated in FIG. 1 has been omitted, the terminal device 1 illustrated in FIG. 9 does not accept operations on the power key 20. Accordingly, the terminal device 1 accepts a touch operation on the touch panel 10 above the fingerprint sensor 50 instead of an operation on the power key 20. For example, in a case in which the touch panel 10 is touched above the fingerprint sensor 50, the terminal device 1 turns on the power or turns on the display provided by the touch panel 10, and displays the lock screen 210. Additionally, the terminal device 1 does not simply display the lock screen 210, but also acquires fingerprint information from the finger touching the touch panel 10 above the fingerprint sensor 50, conducts the authentication process, and conducts the transition to the home screen 230. Because of such a change in the operation method, performing the cancel operation while the transition screen 220 is being displayed may become even more difficult for the user.

Accordingly, the terminal device 1 toggles whether or not to start the authentication process on the basis of operation information. In other words, the terminal device 1 toggles whether or not to start the transition to the home screen 230 in accordance with a user operation. Hereinafter, UI transitions related to such a feature will be described with reference to FIG. 10.

Figure 10:
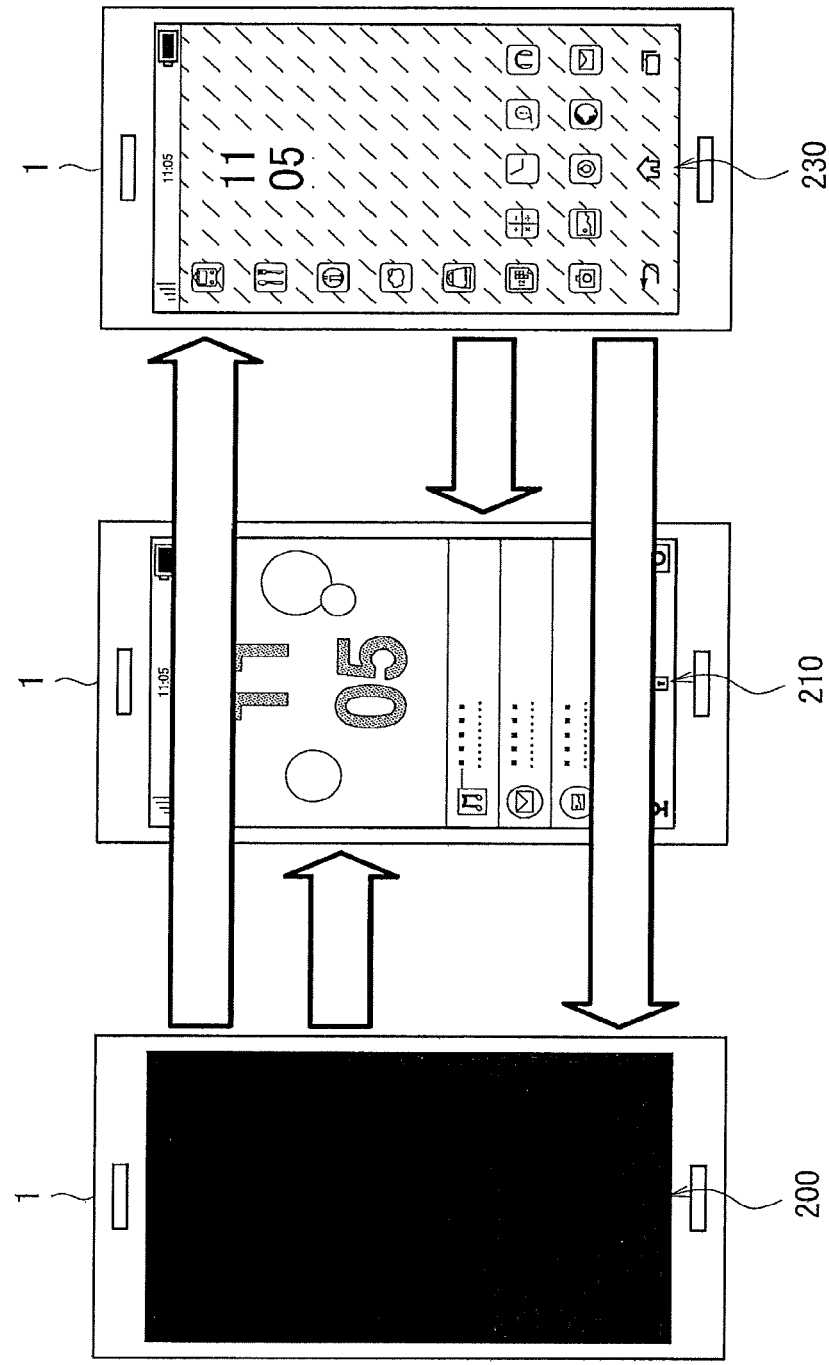
FIG. 10 is a diagram for explaining an example of UI transitions in a terminal device according to an embodiment.

FIG. 10 is a diagram for explaining an example of UI transitions in the terminal device 1 according to the present embodiment. As illustrated in FIG. 10, there are two systems of screen transitions originating from the initial screen 200 by the terminal device 1. For example, in a case of obtaining first operation information indicating that a first operation has been performed on the touch panel 10 after transitioning from the initial screen 200 to the lock screen 210, the terminal device 1 starts the authentication process. In this case, the authentication process is started on the basis of biometric information (that is, fingerprint information) obtained by the fingerprint sensor 50 from the finger touching the display screen (that is, the touch panel 10) displaying the lock screen 210. With this arrangement, the terminal device 1 displays a transition screen 220 omitted from illustration together with the start of the authentication process, seamlessly and without stopping on the display of the lock screen 210, and in a case in which the authentication process is successful, the terminal device 1 displays the home screen 230. On the other hand, in a case of obtaining second operation information indicating that a second operation has been performed on the touch panel 10 displaying the initial screen 200, the terminal device 1 does not start the authentication process. In this case, the terminal device 1 stops the transition in the state of displaying the lock screen 210. In this way, the user becomes able to select intentionally whether to continue the transition to the home screen 230 or stop the transition at the lock screen 210.

The first operation and the second operation may be set arbitrarily. For example, the terminal device 1 may toggle whether or not to start the authentication process on the basis of the touch position on the display screen displaying the lock screen 210, the direction of the touching finger, the touch surface area, or the number of touches. Specifically, an operation of placing a finger broadly onto the touch panel 10 displaying the touch panel 10 may be the first operation, while an operation of placing a finger narrowly may be the second operation. Also, a tap operation on the touch panel 10 displaying the lock screen 210 may be the first operation, while a double tap operation may be the second operation.

Also, as illustrated in FIG. 10, after transitioning from the initial screen 200 or the lock screen 210 and displaying the home screen 230 once, it is possible to transition from the home screen 230 to the initial screen 200 or the lock screen 210. For example, in the case of obtaining certain operation information while the home screen 230 is displayed, the terminal device 1 may display the lock screen 210 or the initial screen 200. A variety of certain operation information is conceivable. For example, the terminal device 1 may display the lock screen 210 in a case in which a tap or a double tap is performed on the touch panel 10 above the fingerprint sensor 50 while the home screen 230 is displayed, or the terminal device 1 may display the initial screen 200 in a case in which a touch is performed for at least a certain amount of time. In this way, by enabling a transition from the home screen 230 to the lock screen 210, in a case in which the user mistakenly causes a transition to the home screen 230, the user becomes able to return the display to the lock screen 210 easily. This applies similarly to the initial screen 200.

Next, an example of the flow of a process related to transition control corresponding to the operation method will be described with reference to FIGS. 11 and 12.

Figure 11:
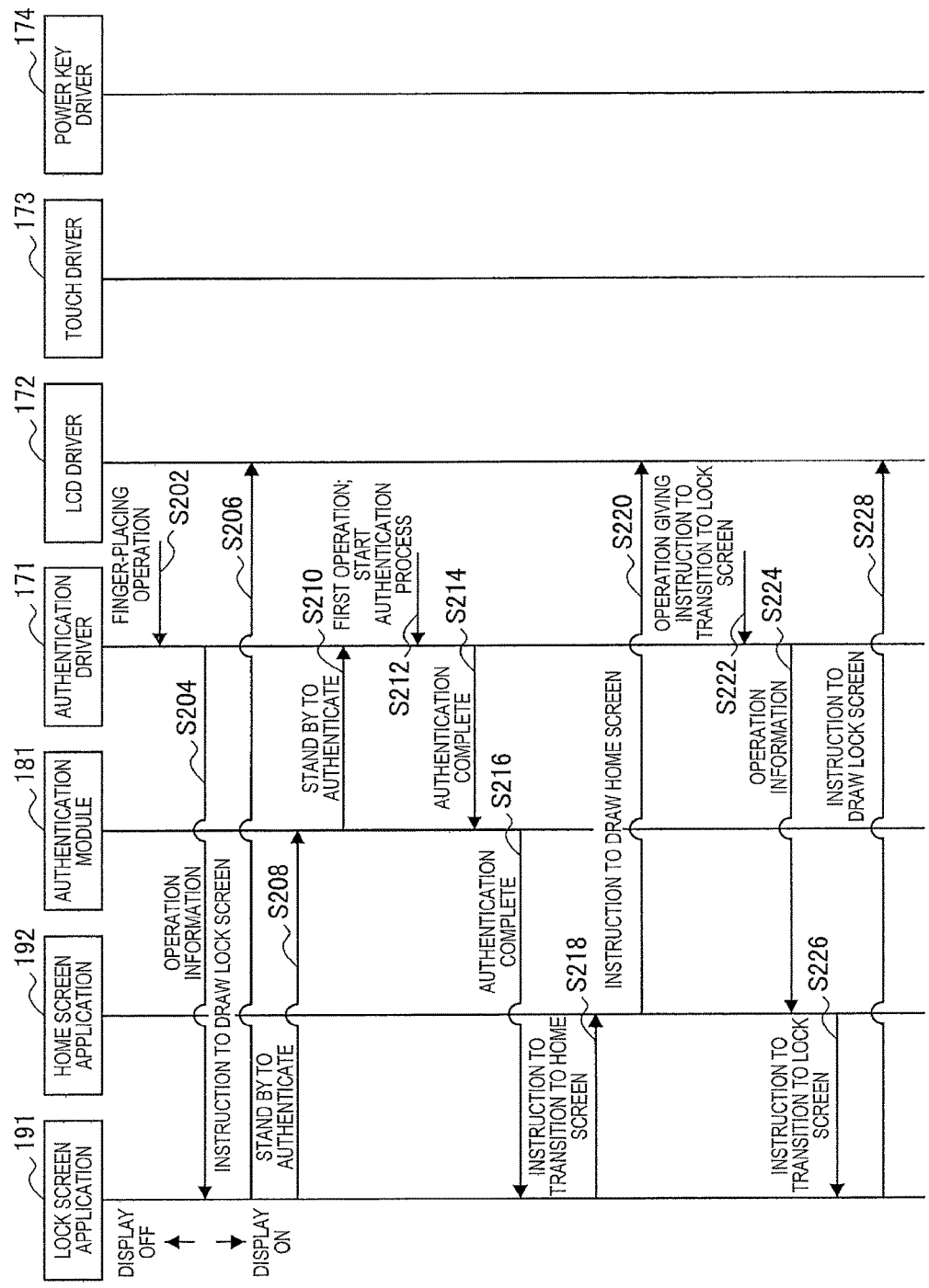
FIG. 11 is a sequence diagram illustrating an example of a flow of a display control process executed in a terminal device according to an embodiment.
Figure 12:
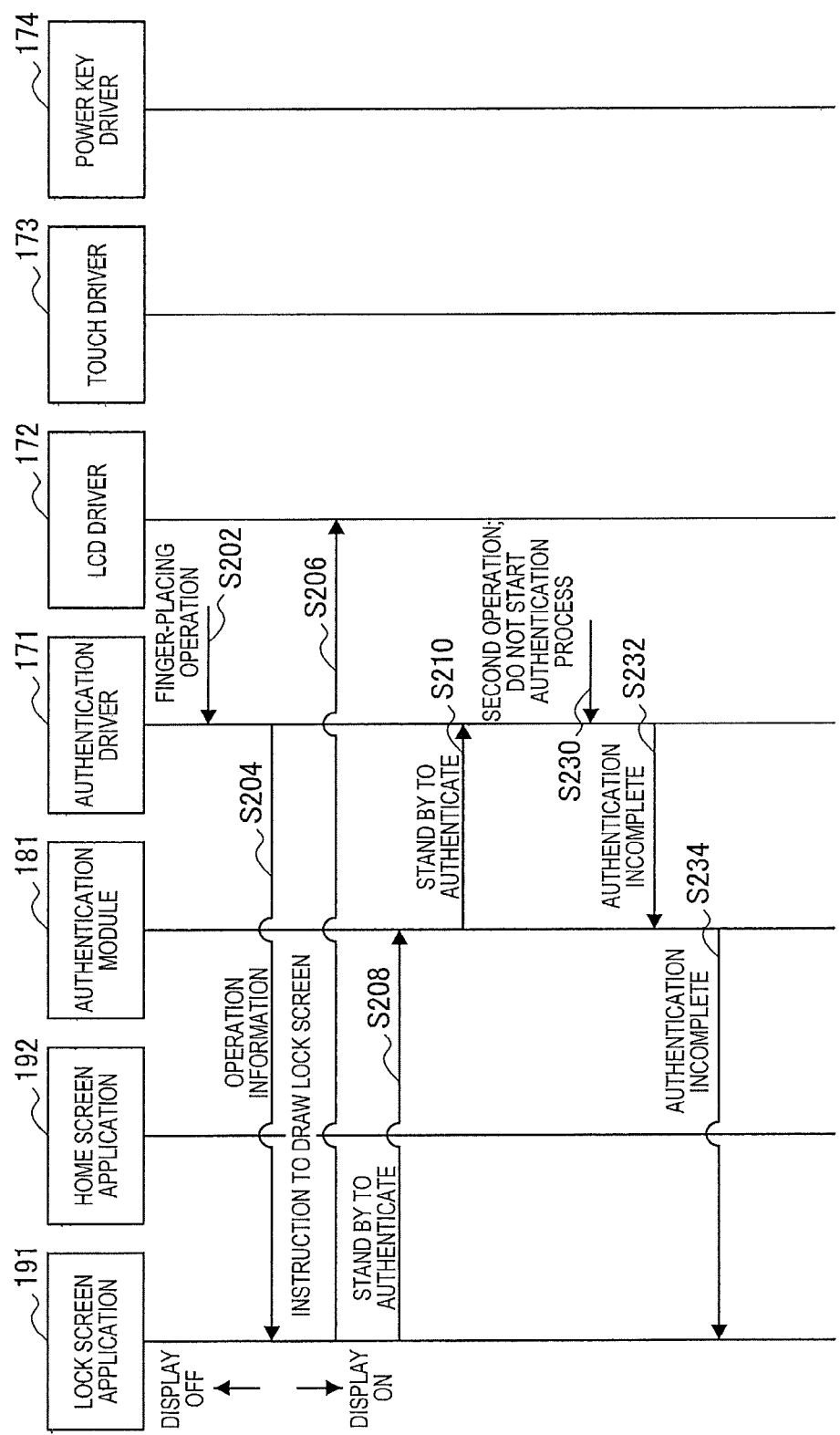
FIG. 12 is a sequence diagram illustrating an example of a flow of a display control process executed in a terminal device according to an embodiment.

FIGS. 11 and 12 are sequence diagrams illustrating examples of the flow of a display control process executed in the terminal device 1 according to the present embodiment. These sequences involve the lock screen application 191, the home screen application 192, the authentication module 181, the authentication driver 171, and the LCD driver 172. Note that description related to the transition screen 220 will be reduced or omitted herein.

Hereinafter, a case in which the first operation is performed will be described with reference to FIG. 11. First, the authentication driver 171 detects an operation of placing a finger on the touch panel 10 above the fingerprint sensor 50 (step S202), and notifies the lock screen application 191 of operation information indicating that a finger-placing operation has been detected (step S204). This notification acts as a trigger causing the state of the touch panel 10 to be switched from the display being off to the display being on. Subsequently, the lock screen application 191 issues an instruction to draw the lock screen 210 to the LCD driver 172, thereby causing the touch panel 10 to display the lock screen 210 (step S206). Next, the lock screen application 191 sets the authentication module 181 to an authentication standby state (step S208). Subsequently, the authentication module 181 sets the authentication driver 171 to an authentication standby state (step S210).

Subsequently, the authentication driver 171 starts the authentication process in a case of detecting that the finger-placing operation in step S202 is the first operation (step S212). Note that step S202 and step S212 are executed on the basis of the single operation of placing a finger on the touch panel 10 above the fingerprint sensor 50. Next, if the authentication process is successful, the authentication driver 171 notifies the authentication module 181 of information indicating that authentication is complete (step S214). Subsequently, the authentication module 181 notifies the lock screen application 191 of information indicating that authentication is complete (step S216). Next, the lock screen application 191 issues an instruction to transition to the home screen 230 to the home screen application 192 (step S218). Additionally, the home screen application 192 issues an instruction to draw the home screen 230 to the LCD driver 172, thereby causing the touch panel 10 to display the home screen 230 (step S220).

Subsequently, if the authentication driver 171 detects an operation giving an instruction to transition to the lock screen 210, such as a tap or a double tap for going back to the lock screen 210 (step S222), the authentication driver 171 notifies the home screen application 192 of operation information indicating that such an operation has been performed (step S224). Next, the home screen application 192 issues an instruction to transition to the lock screen 210 to the lock screen application 191 (step S226). Additionally, the lock screen application 191 issues an instruction to draw the lock screen 210 to the LCD driver 172, thereby causing the touch panel 10 to display the lock screen 210 (step S228).

Hereinafter, a case in which the second operation is performed will be described with reference to FIG. 12. Since the process according to steps S202 to S210 is as described above with reference to FIG. 11, repeated description will be omitted. In a case in which the authentication driver 171 detects that the finger-placing operation in step S202 is the second operation, the authentication driver 171 does not start the authentication process (step S230), and instead notifies the authentication module 181 of information indicating that the authentication process is incomplete (step S232). Note that step S202 and step S230 are executed on the basis of the single operation of placing a finger on the touch panel 10 above the fingerprint sensor 50. Subsequently, the authentication module 181 notifies the lock screen application 191 of information indicating that the authentication process is incomplete (step S234).

4. Second Embodiment

The present embodiment provides the conveniences of the lock screen 210 on the home screen 230. Specifically, the terminal device 1 according to the present embodiment causes an image based on the lock screen 210 to be displayed on the home screen 230. With this arrangement, the user becomes able to enjoy the conveniences of the lock screen 210, such as checking important information and performing operations easily, on the home screen 230. A variety of images based on the lock screen 210 are conceivable. Hereinafter, these variations will be described in detail.

<4.1. UI Element Transfer>

The image based on the lock screen 210 may be an image including UI elements that had been displayed on the lock screen 210. First, a specific example of the UI in such a case will be described with reference to FIGS. 13 to 16.

Figure 13:
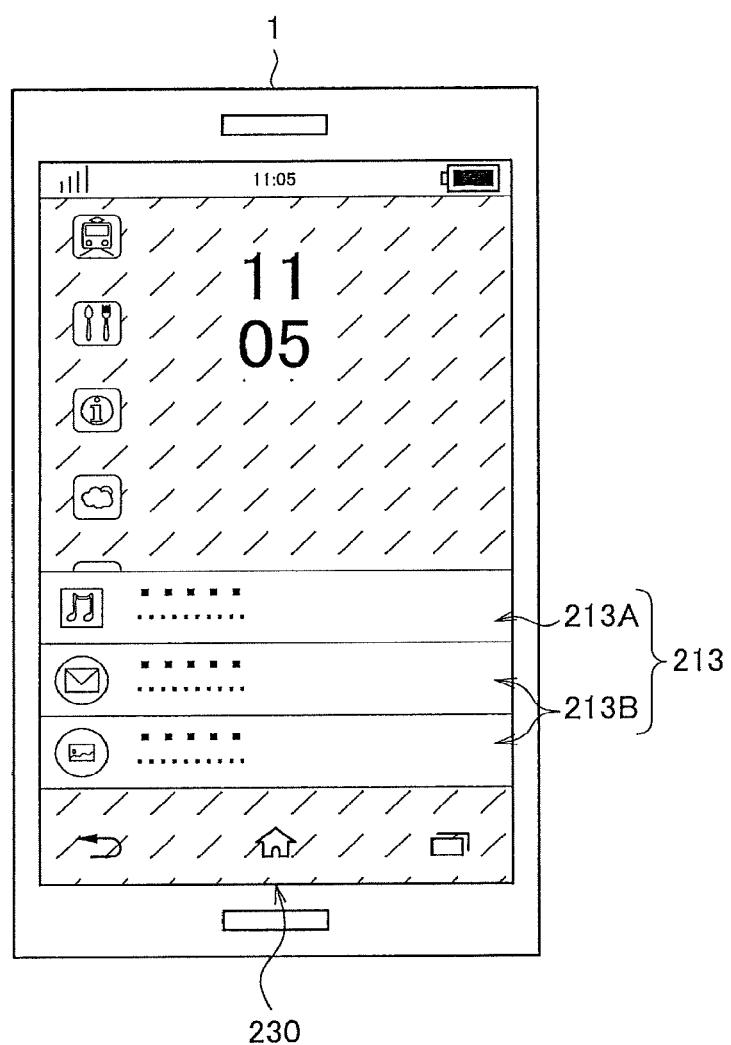
FIG. 13 is a diagram for explaining a specific example of a UI according to a second embodiment.

FIG. 13 is a diagram for explaining a specific example of a UI according to the present embodiment. As illustrated in FIG. 13, on the home screen 230, an image including information displayed on the lock screen 210 (for example, UI elements) may be displayed as an image based on the lock screen 210. In the example illustrated in FIG. 13, the widget 213 that had been displayed on the lock screen 210 has been transferred to the home screen 230. The terminal device 1 may also control the display in accordance with operation information indicating an operation on the image based on the lock screen 210. More simply, the terminal device 1 is able to accept user operations on the widget 213. For example, in a case in which a touch operation is performed on the music controller 213A, the terminal device 1 toggles between playing and stopping music or the like, and in a case in which a touch operation is performed on the notification information 213B, the terminal device 1 launches the application from which the notification originated and displays detailed information. The terminal device 1 overlays the image based on the widget 213 onto the home screen 230. As illustrated in FIG. 13, while the conveniences of the lock screen 210 are provided by the transfer of the widget 213, some of the icons on the home screen 230 may be hidden by the overlaid widget 213.

Figure 14:
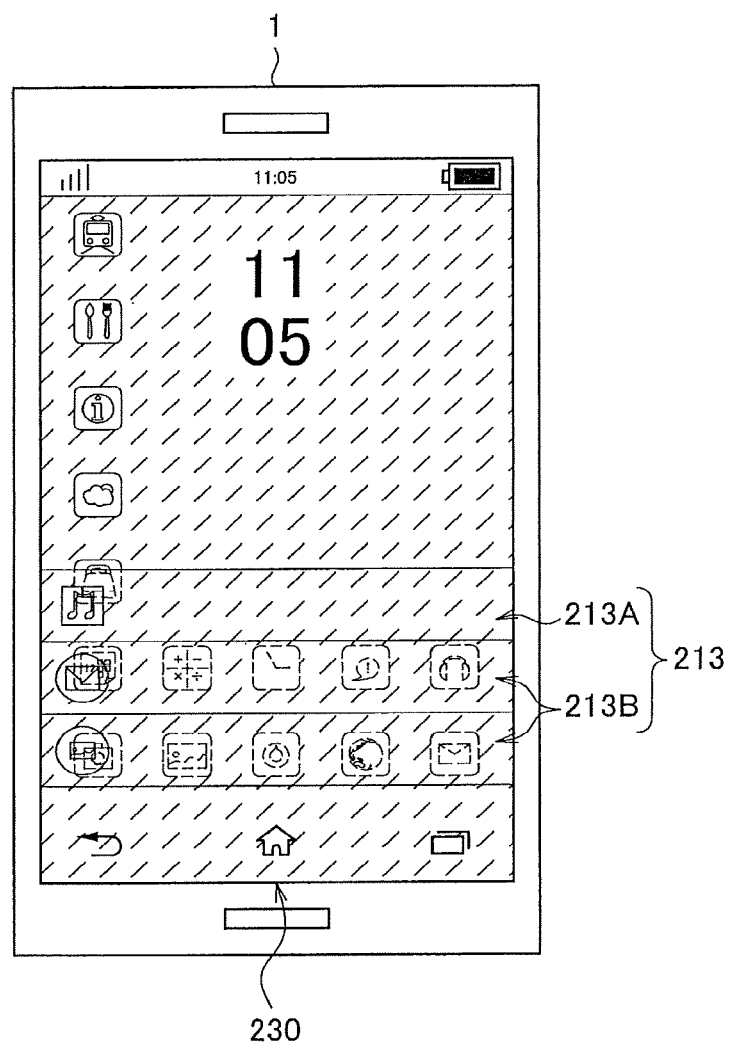
FIG. 14 is a diagram for explaining a specific example of a UI according to an embodiment.

FIG. 14 is a diagram for explaining a specific example of a UI according to the present embodiment. As illustrated in FIG. 14, the widget 213 is displayed on the home screen 230 as an image based on the lock screen 210. However, in the example illustrated in FIG. 14, the terminal device 1 transparently overlays the image based on the lock screen 210. By transparently overlaying the image based on the lock screen 210, the terminal device 1 becomes able to reduce the decrease in the visibility of the UI elements included on the home screen 230. Note that the terminal device 1 may also increase the transparency of the image based on the lock screen 210 over time, thereby causing the image based on the lock screen 210 to fade out. The terminal device 1 is able to accept user operations on the widget 213.

Figure 15:
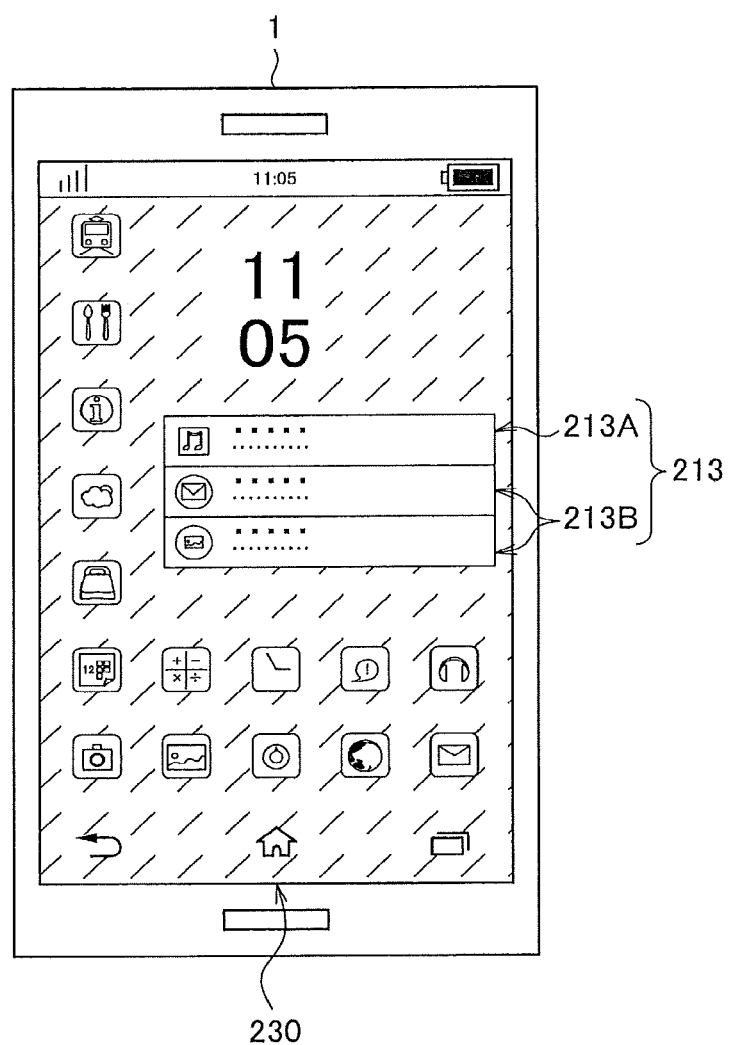
FIG. 15 is a diagram for explaining a specific example of a UI according to an embodiment.

FIG. 15 is a diagram for explaining a specific example of a UI according to the present embodiment. As illustrated in FIG. 15, the widget 213 is overlaid onto the home screen 230 as an image based on the lock screen 210, and the terminal device 1 accepts user operations on the widget 213. The terminal device 1 may also control the display of the image based on the lock screen 210 in accordance with the content of the home screen 230. For example, the terminal device 1 may control properties such as the size, display position, and transparency of the image based on the lock screen 210, or the layout of information inside the image, inappropriate the content of the home screen 230. In the example illustrated in FIG. 15, the terminal device 1 reduces the size of the widget 213 and changes the display position so that the icons on the home screen 230 are not hidden. With this arrangement, the terminal device 1 becomes able to reduce the decrease in the visibility of the UI elements included on the home screen 230.

Figure 16:
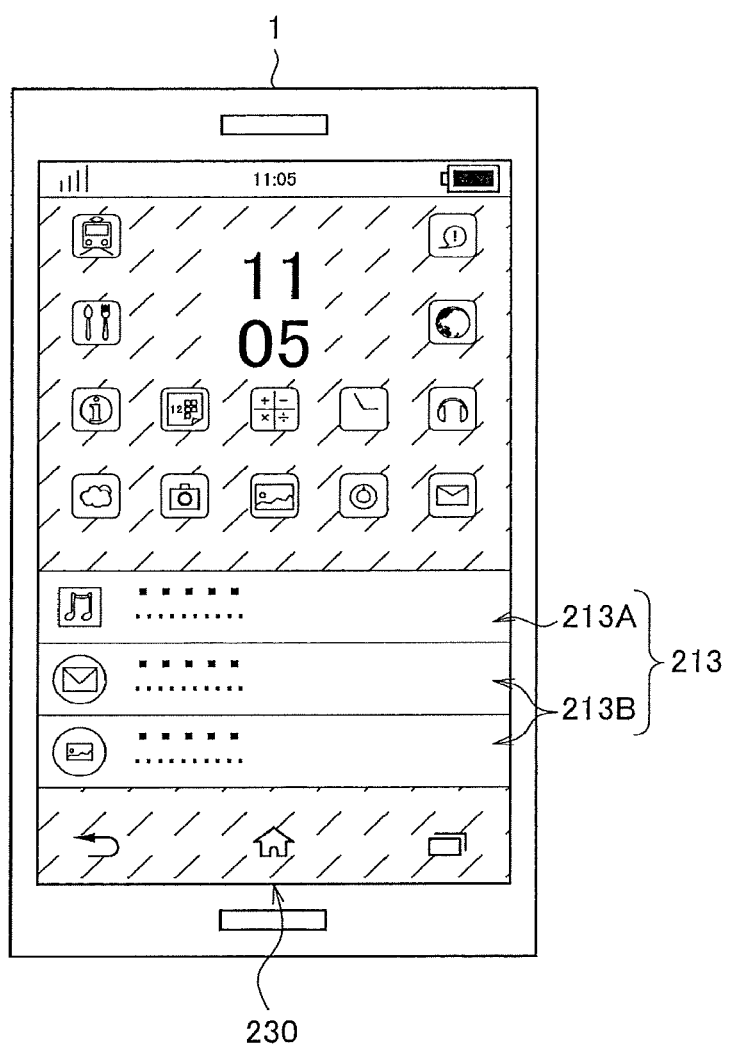
FIG. 16 is a diagram for explaining a specific example of a UI according to an embodiment.

FIG. 16 is a diagram for explaining a specific example of a UI according to the present embodiment. As illustrated in FIG. 16, the widget 213 is overlaid onto the home screen 230 as an image based on the lock screen 210, and the terminal device 1 accepts user operations on the widget 213. The terminal device 1 may also control the layout of the home screen 230 in accordance with the image based on the lock screen 210. For example, the terminal device 1 may control properties such as the size or display position of UI elements included on the home screen 230, in accordance with the image based on the lock screen 210. In the example illustrated in FIG. 16, the terminal device 1 rearranges the icons on the home screen 230 to positions not hidden by the widget 213. With this arrangement, the terminal device 1 becomes able to reduce the decrease in the visibility of the UI elements included on the home screen 230.

Note that although the above describes the widget 213 as one example of an image based on the lock screen 210, the present technology is not limited to such an example. For example, UI elements that had been displayed on the lock screen 210 may be altered and displayed in ways other than being displayed on the home screen 230 as-is. For example, an image generated by simplifying or integrating UI elements that had been displayed on the lock screen 210 or the like may be displayed on the home screen 230.

In the present embodiment, similarly to the first embodiment, a transition from the home screen 230 to the initial screen 200 or the lock screen 210 is also possible. For example, in the case of obtaining certain operation information while the home screen 230 is displayed, the terminal device 1 may display the lock screen 210. A variety of certain operation information is conceivable. For example, the terminal device 1 may display the lock screen 210 in a case in which a tap, a double tap, or a press held for at least a certain amount of time is performed on the power key 20 while the home screen 230 is displayed.

Next, an example of the flow of a process related to display control related to UI element transfer will be described with reference to FIG. 17.

Figure 17:
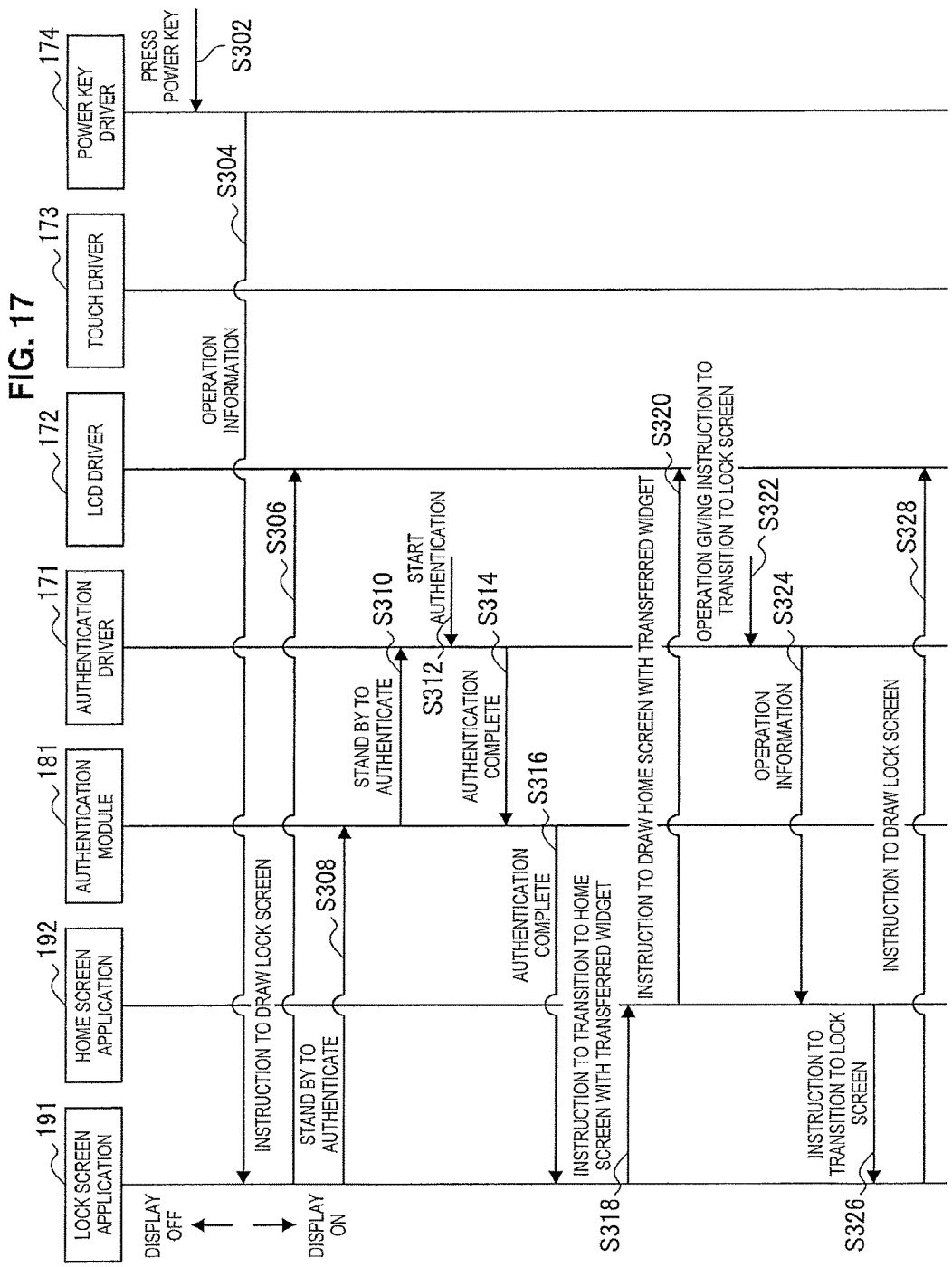
FIG. 17 is a sequence diagram illustrating an example of a flow of a display control process executed in a terminal device according to an embodiment.

FIG. 17 is a sequence diagram illustrating an example of the flow of a display control process executed in the terminal device 1 according to the present embodiment. This sequence involves the lock screen application 191, the home screen application 192, the authentication module 181, the authentication driver 171, the LCD driver 172, and the power key driver 174. Note that description related to the transition screen 220 will be reduced or omitted herein.

As illustrated in FIG. 17, first, the power key driver 174 detects an operation of pressing the power key 20 (step S302), and notifies the lock screen application 191 of operation information indicating that the power key 20 has been pressed (step S304). This notification acts as a trigger causing the state of the touch panel 10 to be switched from the display being off to the display being on. Subsequently, the lock screen application 191 issues an instruction to draw the lock screen 210 to the LCD driver 172, thereby causing the touch panel 10 to display the lock screen 210 (step S306). Next, the lock screen application 191 sets the authentication module 181 to an authentication standby state (step S308). Subsequently, the authentication module 181 sets the authentication driver 171 to an authentication standby state (step S310) Subsequently, the authentication driver 171 starts the authentication process in a case of detecting authentication information (step S312). At this point, in a case in which fingerprint information is detected when the power key 20 is pressed, for example, step S302 and step S312 are executed on the basis of the single operation of pressing the power key 20.

Next, if the authentication process is successful, the authentication driver 171 notifies the authentication module 181 of information indicating that authentication is complete (step S314). Subsequently, the authentication module 181 notifies the lock screen application 191 of information indicating that authentication is complete (step S316). Next, the lock screen application 191 issues, to the home screen application 192, an instruction to transition to the home screen 230 to which is transferred the widget 213 that had been displayed on the lock screen 210 (step S318). Additionally, the home screen application 192 issues an instruction to draw the home screen 230 with the transferred widget 213 to the LCD driver 172, thereby causing the touch panel 10 to display the home screen 230 with the transferred widget 213 (step S320).

Subsequently, if the authentication driver 171 detects an operation giving an instruction to transition to the lock screen 210, such as a tap or a double tap for going back to the lock screen 210 (step S322), the authentication driver 171 notifies the home screen application 192 of operation information indicating that such an operation has been performed (step S324). Next, the home screen application 192 issues an instruction to transition to the lock screen 210 to the lock screen application 191 (step S326). Additionally, the lock screen application 191 issues an instruction to draw the lock screen 210 to the LCD driver 172, thereby causing the touch panel 10 to display the lock screen 210 (step S328).

<4.2. Reduced Image of Lock Screen>

The image based on the lock screen 210 may also be a reduced image of the lock screen 210. Hereinafter, a specific example of the UI in such a case will be described with reference to FIG. 18.

Figure 18:
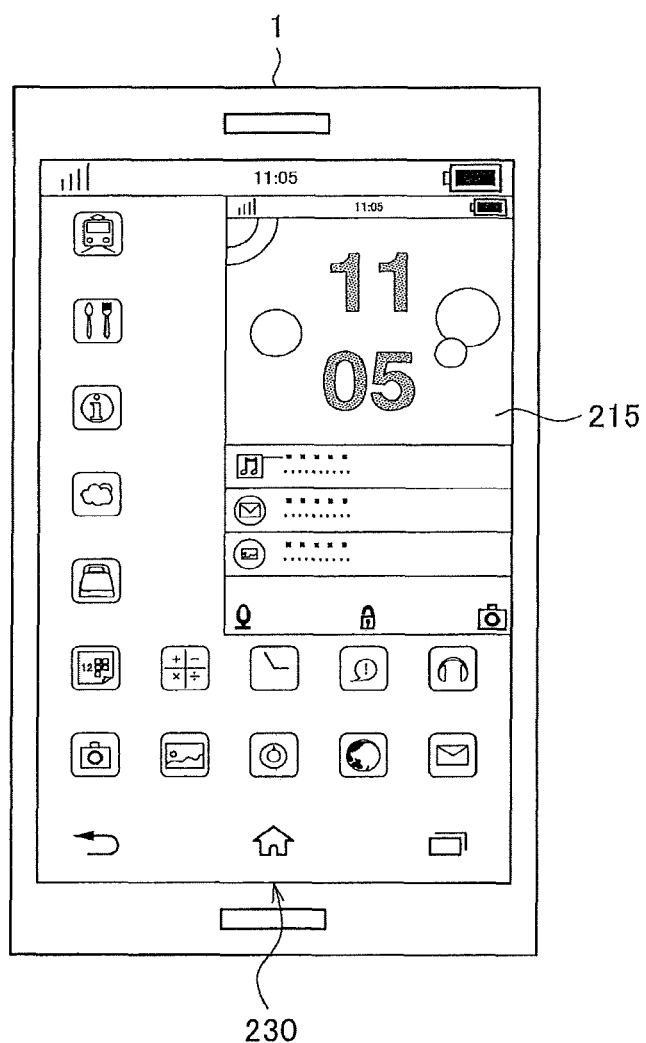
FIG. 18 is a diagram for explaining a specific example of a UI according to an embodiment.

FIG. 18 is a diagram for explaining a specific example of a UI according to the present embodiment. As illustrated in FIG. 18, a reduced image 215 obtained by reducing the lock screen 210 is overlaid onto the home screen 230 as the image based on the lock screen 210. With this arrangement, the terminal device 1 becomes able to provide the conveniences of the lock screen 210 on the home screen 230. Also, the terminal device 1 is able to accept user operations on the reduced image 215. For example, in a case of obtaining operation information indicating a certain operation, such as a tap operation on the reduced image 215, the terminal device 1 displays the lock screen 210. In this way, by enabling a transition from the home screen 230 to the lock screen 210, in a case in which the user mistakenly causes a transition to the home screen 230, the user becomes able to return the display to the lock screen 210 easily. Otherwise, in the reduced image 215, in a case in which a tap operation or the like is performed on a region corresponding to the widget 213 that had been displayed on the lock screen 210, the terminal device 1 may launch the corresponding application or the like.

The method of displaying the reduced image 215 may have variations similar to the display method related to the transfer of UI elements from the lock screen 210. For example, the terminal device 1 may transparently overlay the reduced image 215 onto the home screen 230. Also, the terminal device 1 may control the display of the reduced image 215 in accordance with the content of the home screen 230, or conversely, control the layout of the home screen 230 in accordance with the reduced image 215.

Next, an example of the flow of a process related to display control related to the reduced image 215 of the lock screen 210 will be described with reference to FIG. 19.

Figure 19:
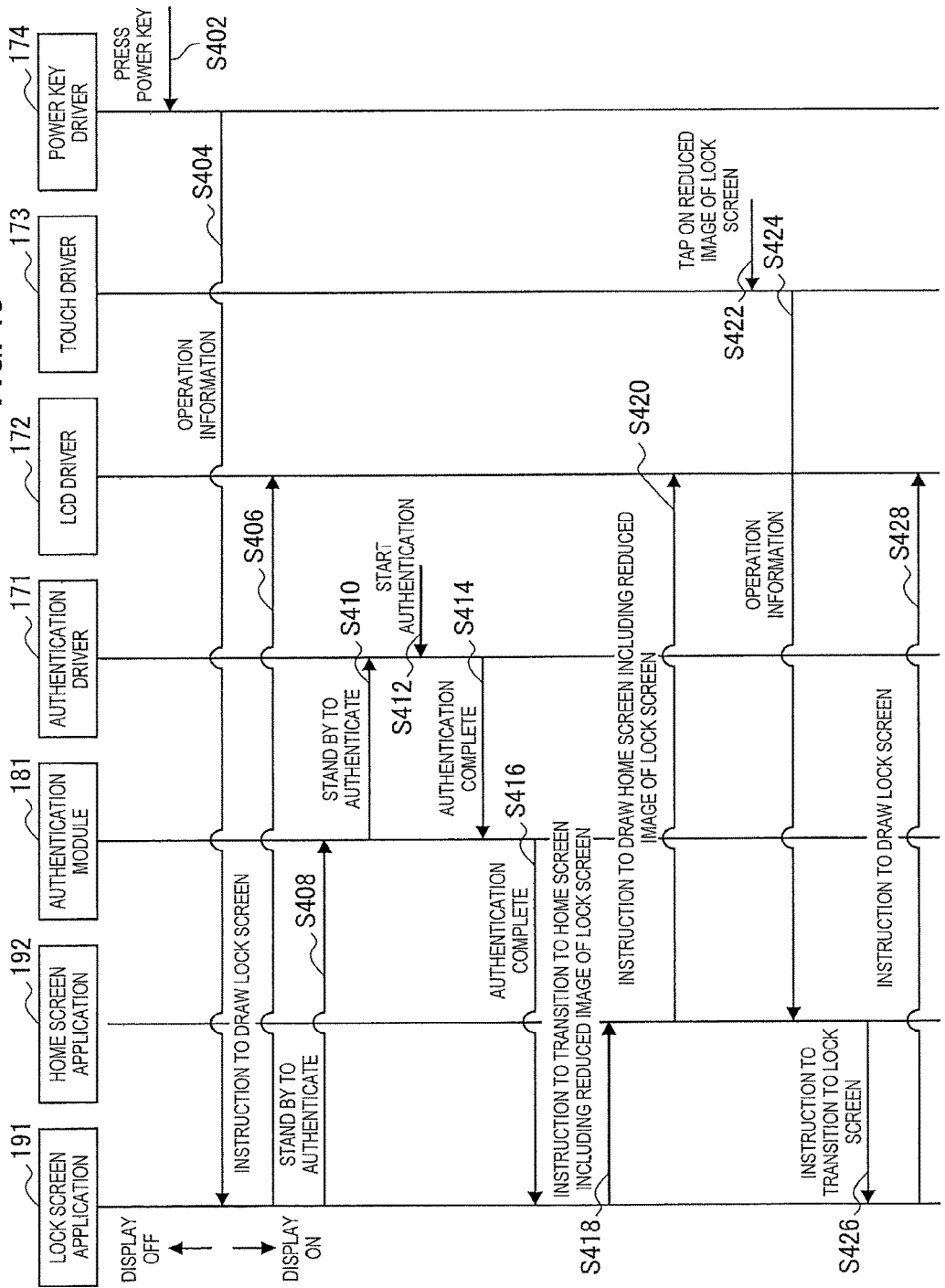
FIG. 19 is a sequence diagram illustrating an example of a flow of a display control process executed in a terminal device according to an embodiment.

FIG. 19 is a sequence diagram illustrating an example of the flow of a display control process executed in the terminal device 1 according to the present embodiment. This sequence involves the lock screen application 191, the home screen application 192, the authentication module 181, the authentication driver 171, the LCD driver 172, the touch driver 173, and the power key driver 174. Note that description related to the transition screen 220 will be reduced or omitted herein.

As illustrated in FIG. 19, first, the power key driver 174 detects an operation of pressing the power key 20 (step S402), and notifies the lock screen application 191 of operation information indicating that the power key 20 has been pressed (step S404). This notification acts as a trigger causing the state of the touch panel 10 to be switched from the display being off to the display being on. Subsequently, the lock screen application 191 issues an instruction to draw the lock screen 210 to the LCD driver 172, thereby causing the touch panel 10 to display the lock screen 210 (step S406). Next, the lock screen application 191 sets the authentication module 181 to an authentication standby state (step S408). Subsequently, the authentication module 181 sets the authentication driver 171 to an authentication standby state (step S410). Subsequently, the authentication driver 171 starts the authentication process in a case of detecting authentication information (step S412). At this point, in a case in which fingerprint information is detected when the power key 20 is pressed, for example, step S402 and step S412 are executed on the basis of the single operation of pressing the power key 20.

Next, if the authentication process is successful, the authentication driver 171 notifies the authentication module 181 of information indicating that authentication is complete (step S414). Subsequently, the authentication module 181 notifies the lock screen application 191 of information indicating that authentication is complete (step S416). Next, the lock screen application 191 issues, to the home screen application 192, an instruction to transition to the home screen 230 including the reduced image 215 of the lock screen 210 (step S418). Additionally, the home screen application 192 issues an instruction to draw the home screen 230 including the reduced image 215 of the lock screen 210 to the LCD driver 172, thereby causing the touch panel 10 to display the home screen 230 including the reduced image 215 of the lock screen 210 (step S420).

Subsequently, if the touch driver 173 detects a certain operation for going back to the lock screen 210, such as a tap operation on the reduced image 215 of the lock screen 210 displayed on the home screen 230 (step S422), the touch driver 173 notifies the home screen application 192 of operation information indicating that such an operation has been performed (step S424). Next, the home screen application 192 issues an instruction to transition to the lock screen 210 to the lock screen application 191 (step S426). Additionally, the lock screen application 191 issues an instruction to draw the lock screen 210 to the LCD driver 172, thereby causing the touch panel 10 to display the lock screen 210 (step S428).

5. Third Embodiment

In the present embodiment, switching the power on/off or the display on/off and starting the authentication process are performed on the basis of different operations. First, an exemplary configuration of the terminal device 1 according to the present embodiment will be described with reference to FIG. 20.

Figure 20:
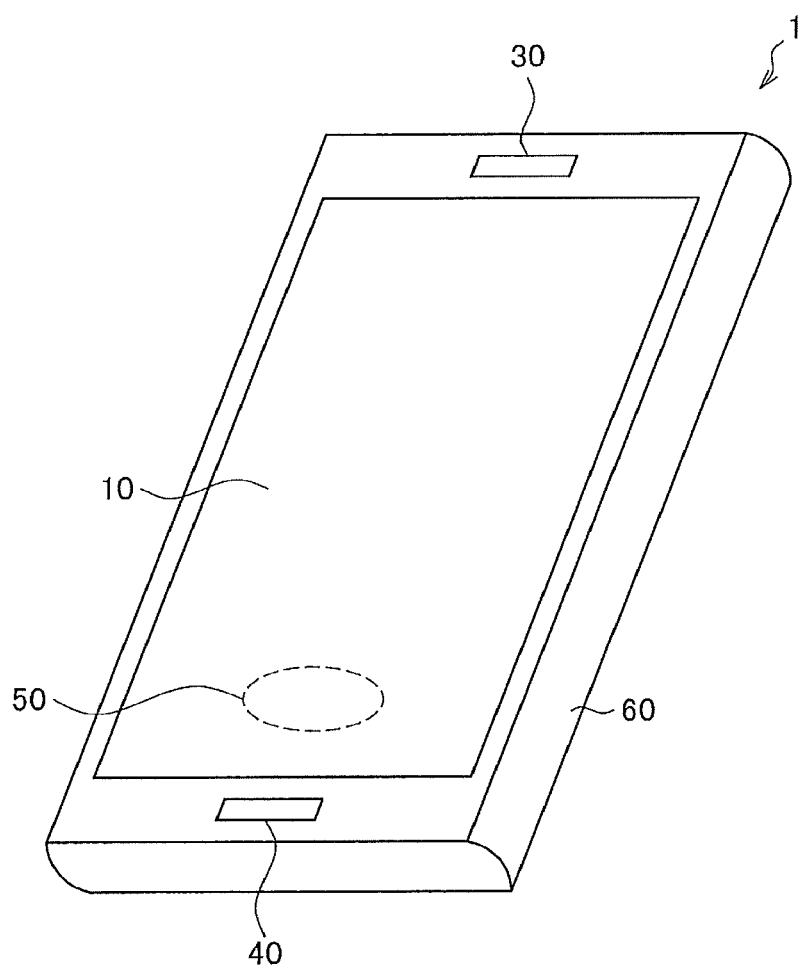
FIG. 20 is a diagram illustrating an example of an exterior configuration of a terminal device according to a third embodiment.

FIG. 20 is a diagram illustrating an example of an exterior configuration of the terminal device 1 according to the present embodiment. As illustrated in FIG. 20, the terminal device 1 includes a touch panel 10, a speaker 30, a microphone 40, a fingerprint sensor 50 provided underneath the touch panel 10, and a side touch sensor 60 provided on the lateral periphery of the terminal device 1. The side touch sensor 60 is made up of a touch sensor, pressure sensor, or the like, and is capable of detecting an operation of the user squeezing the terminal device 1, more specifically an operation of squeezing the sides of the terminal device 1.

Since the power key 20 from the configuration illustrated in FIG. 1 has been omitted, the terminal device 1 illustrated in FIG. 20 does not accept operations on the power key 20. Accordingly, the terminal device 1 accepts an operation of squeezing the terminal device 1 instead of an operation on the power key 20. For example, in a case in which the user squeezes the terminal device 1, the terminal device 1 turns on the power, or turns on the display provided by the touch panel 10, and displays the lock screen 210. Additionally, in a case in which the user places a finger on the touch panel 10 above the fingerprint sensor 50, the terminal device 1 acquires fingerprint information, conducts the authentication process, and conducts the transition to the home screen 230. In this way, in the present embodiment, the display of the lock screen 210 and the transition from the lock screen 210 to the home screen 230 are conducted in response to different operations. In other words, the terminal device 1 does not transition from the initial screen 200 to the home screen 230 seamlessly on the basis of a single operation. For this reason, the user becomes able to stop the transition intentionally on the lock screen 210.

Next, an example of the flow of a process related to display control using the side touch sensor 60 will be described with reference to FIG. 21.

Figure 21:
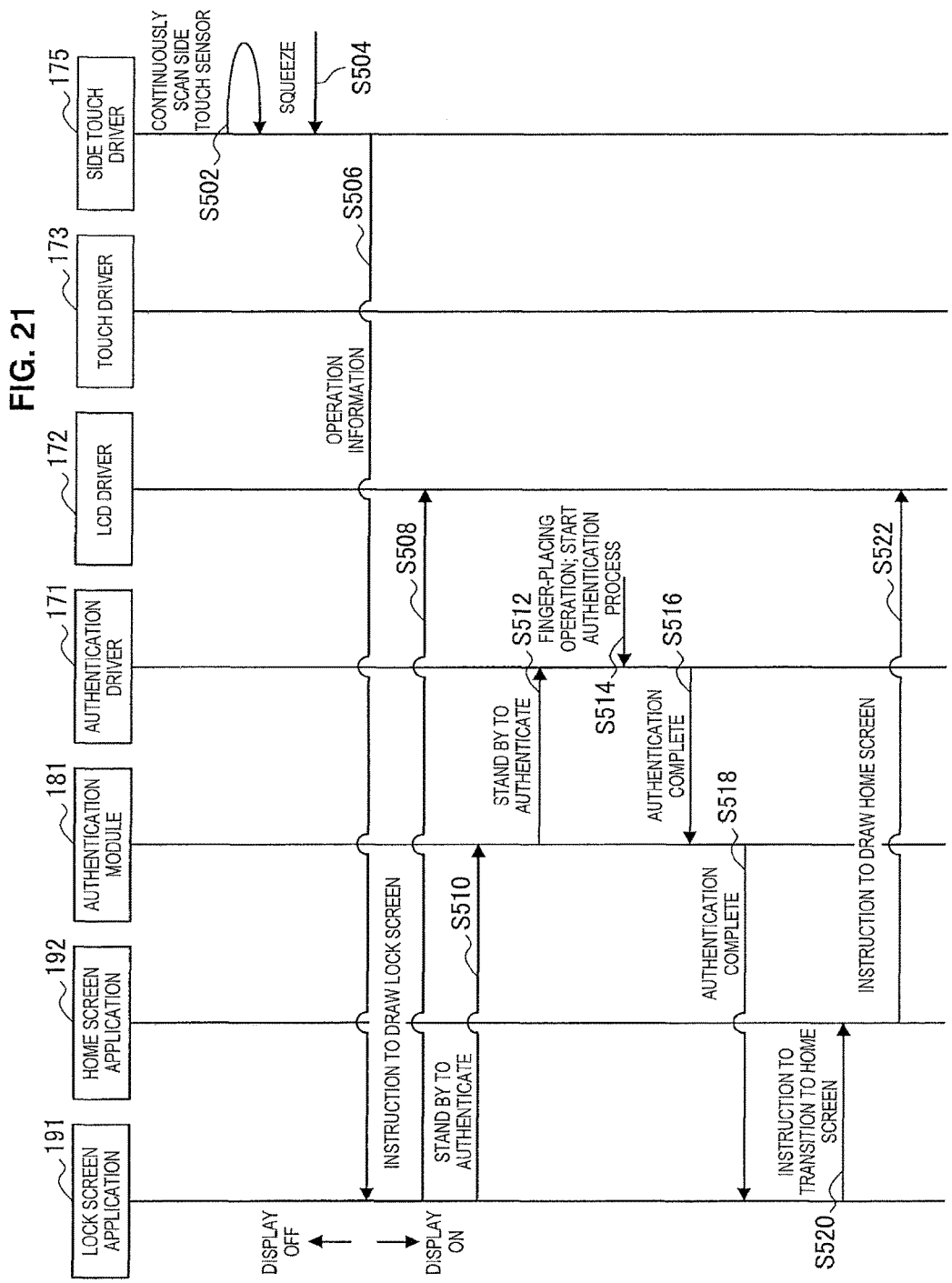
FIG. 21 is a sequence diagram illustrating an example of a flow of a display control process executed in a terminal device according to an embodiment.

FIG. 21 is a sequence diagram illustrating an example of the flow of a display control process executed in the terminal device 1 according to the present embodiment. This sequence involves the lock screen application 191, the home screen application 192, the authentication module 181, the authentication driver 171, the LCD driver 172, and a side touch driver 175. Note that the side touch driver 175 is a driver that provides an interface with the side touch sensor 60. Also, description related to the transition screen 220 will be reduced or omitted herein.

As illustrated in FIG. 21, first, the side touch driver 175 continuously scans the side touch sensor 60 (step S502). Next, if the side touch driver 175 detects an operation of squeezing the terminal device 1 (step S504), the side touch driver 175 notifies the lock screen application 191 of operation information indicating that the terminal device 1 has been squeezed (step S506). This notification acts as a trigger causing the state of the touch panel 10 to be switched from the display being off to the display being on. Subsequently, the lock screen application 191 issues an instruction to draw the lock screen 210 to the LCD driver 172, thereby causing the touch panel 10 to display the lock screen 210 (step S508). Next, the lock screen application 191 sets the authentication module 181 to an authentication standby state (step S510). Subsequently, the authentication module 181 sets the authentication driver 171 to an authentication standby state (step S512). Additionally, in a case of detecting the placing of a finger on the touch panel 10 above the fingerprint sensor 50, the authentication driver 171 starts the authentication process (step S514)

Next, if the authentication process is successful, the authentication driver 171 notifies the authentication module 181 of information indicating that authentication is complete (step S516). Subsequently, the authentication module 181 notifies the lock screen application 191 of information indicating that authentication is complete (step S518). Next, the lock screen application 191 issues an instruction to transition to the home screen 230 to the home screen application 192 (step S520). Additionally, the home screen application 192 issues an instruction to draw the home screen 230 to the LCD driver 172, thereby causing the touch panel 10 to display the home screen 230 (step S522).

6. Exemplary Hardware Configuration

Figure 22:
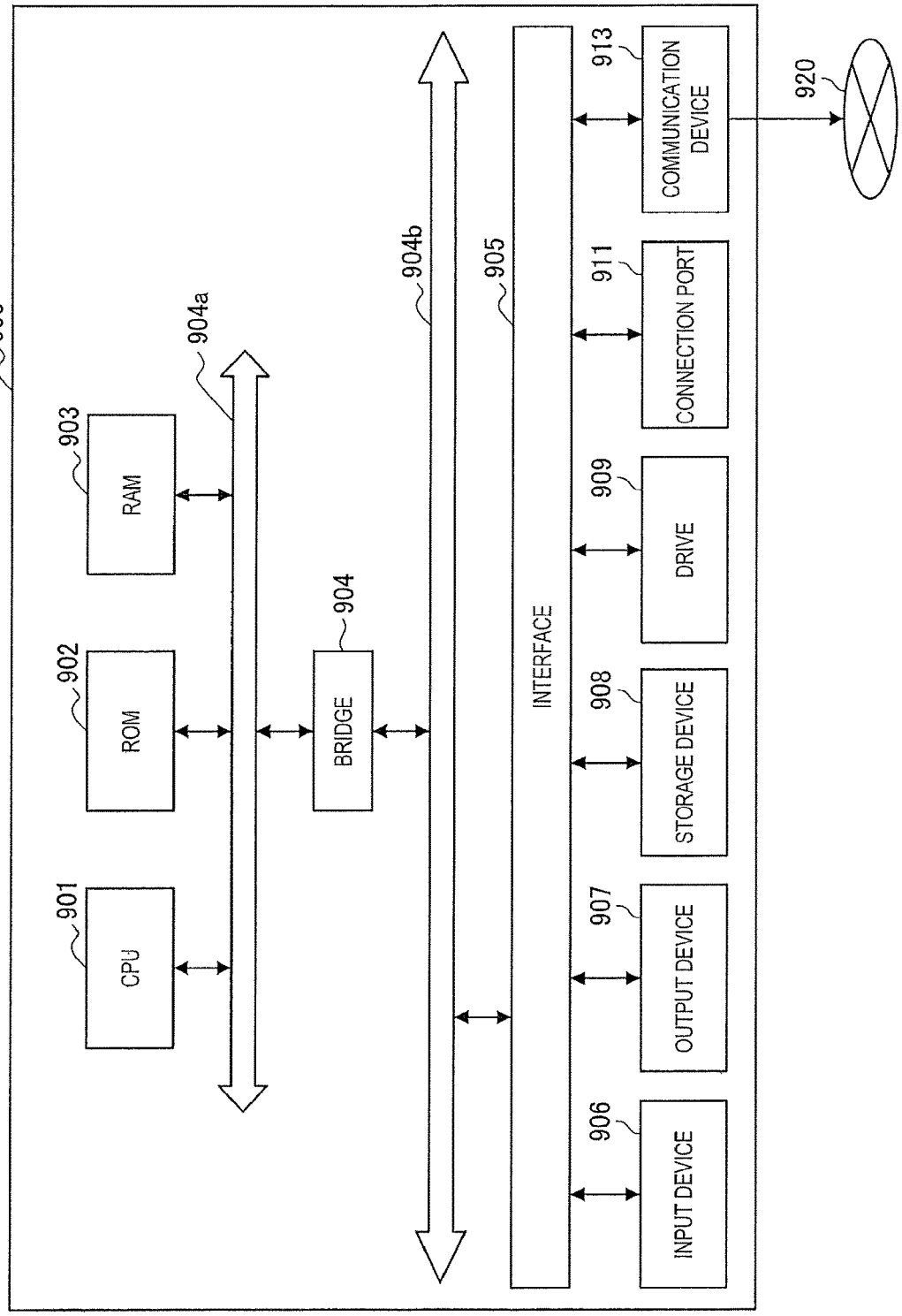
FIG. 22 is a block diagram illustrating an example of a hardware configuration of an information processing device according to an embodiment of the present disclosure.

Lastly, a hardware configuration of an image processing device according to the present embodiment will be described with reference to FIG. 22. FIG. 22 is a block diagram illustrating an example of a hardware configuration of an information processing device according to the present embodiment. Note that the information processing device 900 illustrated in FIG. 22 may realize the terminal device 1 illustrated in FIG. 1, FIG. 2, FIG. 9, or FIG. 20, for example. Information processing by the terminal device 1 according to the present embodiment is realized by cooperative action between software, and the hardware described below.

As illustrated in FIG. 22, the information processing device 900 is provided with a central processing unit (CPU) 901, read-only memory (ROM) 902, random access memory (RAM) 903, and a host bus 904a. In addition, the information processing device 900 is provided with a bridge 904, an external bus 904b, an interface 905, an input device 906, an output device 907, a storage device 908, a drive 909, a connection port 911, and a communication device 913. The information processing device 900 may also include an electric circuit or a processing circuit such as a DSP or an ASIC instead of, or together with, the CPU 901.

The CPU 901 functions as a computational processing device and control device, and controls overall operation inside the information processing device 900 by following various programs. Also, the CPU 901 may be a microprocessor. The ROM 902 stores information such as programs and computational parameters used by the CPU 901. The RAM 903 temporarily stores information such as programs used during execution by the CPU 901, and parameters that change as appropriate during such execution. The CPU 901 may form the processing unit 160 illustrated in FIG. 2, for example.

The CPU 901, the ROM 902, and the RAM 903 are interconnected by the host bus 904a, which includes a CPU bus or the like. The host bus 904a is connected to the external bus 904b such as a Peripheral Component Interconnect/Interface (PCI) bus via the bridge 904. Note that it is not strictly necessary to divide the configuration into the host bus 904a, the bridge 904, and the external bus 904b, and these functions may also be implemented in a single bus.

The input device 906 is realized by devices through which information is input by a user, such as a mouse, a keyboard, a touch panel, buttons, a microphone, switches, and levers. The input device 906 may also be a remote control device utilizing infrared or some other electromagnetic wave, and may also be an externally connected device such as a mobile phone or a PDA supporting operation of the information processing device 900, for example. Furthermore, the input device 906 may also include an input control circuit or the like, which generates an input signal on the basis of information input by a user using the above input means, and outputs the generated input signal to the CPU 901, for example. By operating the input device 906, the user of the information processing device 900 is able to input various data and instruct the information processing device 900 to perform processing actions, for example.

Otherwise, the input device 906 may be formed by a device that senses user-related information. For example, the input device 906 may include various types of sensors, such as an image sensor (for example, a camera), a depth sensor (for example, a stereo camera), an acceleration sensor, a gyro sensor, a geomagnetic sensor, an optical sensor, a sound sensor, a range sensor, and a force sensor. In addition, the input device 906 may also acquire information related to the state of the information processing device 900 itself, such as the attitude and movement speed of the information processing device 900, and information related to the environment surrounding the information processing device 900, such as the brightness or noise surrounding the information processing device 900. In addition, the input device 906 may also include a Global Navigation Satellite System (GNSS) module that receives GNSS signals from GNSS satellites (for example, Global Positioning System (GPS) signals from GPS satellites), and measures position information including the latitude, longitude, and altitude of the device. Additionally, with regard to position information, the input device 906 may also sense position by Wi-Fi (registered trademark), by signal exchange with a device such as a mobile phone, PHS, or smartphone, or by short-range communication or the like.

The input device 906 may form the operation unit 120 illustrated in FIG. 2. For example, the input device 906 accepts operations such as operation on the screen displayed on the touch panel 10, operations on the power key 20, and operations on the side touch sensor 60. Also, the input device 906 may form the audio input/output unit 140 illustrated in FIG. 2. For example, the input device 906 accepts voice input.

The output device 907 is formed by a device capable of visually or aurally reporting acquired information to a user. Such a device may be a display device such as a CRT display device, a liquid crystal display device, a plasma display device, an EL display device, a laser projector, an LED projector, and indicator lights, an audio output device such as one or more speakers and headphones, a printer, or the like. The output device 907 outputs results obtained by various processes conducted by the information processing device 900, for example. Specifically, a display device visually displays results obtained by various processes conducted by the information processing device 900 in various formats, such as text, images, tables, and graphs. On the other hand, an audio output device aurally outputs an analog signal converted from an audio signal made up of playedback speech data, sound data, or the like. The above display device may form the display unit 110 illustrated in FIG. 2, for example. The above audio output device may form the audio input/output unit 140 illustrated in FIG. 2, for example.

The storage device 908 is a device used for data storage, formed as an example of a storage unit in the information processing device 900. The storage device 908 is realized by a magnetic storage device such as an HDD, a semiconductor storage device, an optical storage device, or a magneto-optical storage device, for example. The storage device 908 may include a storage medium, a recording device that records data to the storage medium, a readout device that reads out data from the storage medium, a deletion device that deletes data recorded to the storage medium, and the like. The storage device 908 stores information such as programs executed by the CPU 901, various data, and various externally acquired data. The storage device 908 may form the storage unit 150 illustrated in FIG. 2, for example.

The drive 909 is a reader/writer for a storage medium, and is internally housed inside, or externally attached to, the information processing device 900. The drive 909 reads out information recorded to a removable storage medium such as an inserted magnetic disk, optical disc, magneto-optical disc, or semiconductor memory, and outputs such information to the RAM 903. Additionally, the drive 909 may also write information to a removable storage medium.

The connection port 911 is an interface that connects to an external device, and is a receptacle that connects with an external device capable of data transmission by Universal Serial Bus (USB) or the like, for example.

The communication device 913 is a communication interface formed by a communication device or the like for connecting to a network 920, for example. The communication device 913 is a device such as a communication card for a wired or wireless local area network (LAN), Long Term Evolution (LTE), Bluetooth (registered trademark), or Wireless USB (WUSB), for example. Additionally, the communication device 913 may also be an optical communication router, an asymmetric digital subscriber line (ADSL) router, or a modem for any of various types of communication. The communication device 913 is able to transmit and receive signals and the like to and from the Internet or another communication device in accordance with a certain protocol such as TCP/IP, for example. The communication device 913 may form the authentication unit 130. For example, the communication device 913 receives, as authentication information, device information about a device such as an activity meter or an IoT device carried by the user.

Note that the network 920 is a wired or wireless transmission channel for information transmitted from a device connected to the network 920. For example, the network 920 may encompass a public network such as the Internet, a telephone network, or a satellite communication network, and various types of local area networks (LANs) or wide area networks (WANs) including Ethernet (registered trademark). Additionally, the network 920 may also encompass a dedicated network such as an Internet Protocol virtual private network (IP-VPN).

Heretofore, an example of a hardware configuration capable of realizing the functions of the information processing device 900 according to the embodiment has been described. Each of the structural elements described above may be achieved using a general-purpose material or may be achieved by hardware dedicated to the function of each structural element. Accordingly, the hardware configuration to be used can be changed as appropriate in accordance with the technical level at the time of carrying out the present embodiment.

Note that a computer program for realizing each function of the above information processing device 900 according to the embodiment can be prepared and mounted on a personal computer or the like. It is also possible to provide a computer readable recording medium in which such a computer program is stored. The recording medium is, for example, a magnetic disk, an optical disk, a magneto-optical disk, or a flash memory. For example, the above computer program may also be distributed via a network, instead of using the recording medium.

7. Conclusion

The foregoing thus describes embodiments of the present disclosure in detail, with reference to FIGS. 1 to 22. As described above, the terminal device 1 according to the embodiments acquires authentication information and operation information, and controls the display on the basis of the authentication information or the operation information. Specifically, the terminal device 1 displays the lock screen 210 in a case in which certain operation information is acquired while the initial screen 200 is being displayed, and in a case in which the authentication process based on the authentication information is successful, the terminal device 1 displays an unlocked return screen (for example, the home screen 230).

In the first embodiment, the terminal device 1 controls the transition from the lock screen 210 to the home screen 230 conducted in accordance with the authentication process, on the basis of operation information. For example, the terminal device 1 continues to display the transition screen 220 during the execution period of the authentication process and another period continuous with the execution period, and displays the lock screen 210 in a case in which certain operation information is obtained while the transition screen 220 is being displayed. With this arrangement, the terminal device 1 displays the transition screen 220 not only during the execution period of the authentication process, but also during a period in which the authentication process is not being conducted, thereby making it possible to secure the period of accepting the cancel operation, even in a case in which the execution period of the authentication process becomes excessively short. Consequently, the user becomes able to cancel the transition to the home screen 230 easily and cause the lock screen 210 to be displayed. In addition, the terminal device 1 may also toggle whether or not to execute the authentication process on the basis of operation information. With this arrangement, the user becomes able to select intentionally whether to continue the transition to the home screen 230 or stop the transition at the lock screen 210.

In the second embodiment, the terminal device 1 displays on the home screen 230 an image based on the lock screen 210. For example, on the home screen 230, the terminal device 1 displays a UI element displayed on the lock screen 210, or a reduced image of the lock screen 210. With this arrangement, the user becomes able to enjoy the conveniences of the lock screen 210, such as checking important information and performing operations easily, on the home screen 230.

It should be understood by those skilled in the art that various modifications, combinations, sub-combinations and alterations may occur depending on design requirements and other factors insofar as they are within the scope of the appended claims or the equivalents thereof.

For example, the respective embodiments described above may also be combined appropriately.

Also, although the foregoing describes a smartphone as an example of an information processing device to which the present technology is applied, the present technology is not limited to such an example. For example, the present technology may be applied to an arbitrary device that includes a display device or controls an external display device, such as a tablet, a PC, digital signage, a game console, a wearable device, a television set, or a video playback device.

In addition, the respective devices described in this specification may be realized as a single device, or some or all may be realized as separate devices. For example, of the functional configuration example of the terminal device 1 illustrated in FIG. 2, the processing unit 160 may also be provided in a device such as a server connected to the display unit 110, the operation unit 120, the authentication unit 130, the audio input/output unit 140, and the storage unit 150 over a network or the like.

Additionally, the processes described using the flowcharts and sequence diagrams in this specification are not necessarily executed in the order illustrated in the diagrams. Several processing steps may also be executed in parallel. Also, additional processing steps may be adopted, and some processing steps may be omitted.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1) An information processing device, including:
    an acquisition unit that acquires authentication information and operation information; and
    a display control unit that controls a display on a basis of the authentication information or the operation information acquired by the acquisition unit, in which
    the display control unit
        causes a lock screen to be displayed in a case in which certain operation information is acquired while an initial screen is being displayed,
        causes an unlocked return screen to be displayed in a case in which an authentication process based on the authentication information is successful, and
        controls, on a basis of the operation information, a transition from the lock screen to the return screen conducted in accordance with the authentication process.

(2) The information processing device according to (1), in which
    the display control unit continues to cause a transition screen indicating an ongoing transition from the lock screen to the return screen to be displayed during an execution period of the authentication process and another period continuous with the execution period, and causes the lock screen to be displayed in a case in which certain operation information is obtained while the transition screen is being displayed.

(3) The information processing device according to (2), in which
    the display control unit controls a display period of the transition screen.

(4) The information processing device according to (3), in which
    the display control unit controls a display period of the transition screen in accordance with an operation history of a user.

(5) The information processing device according to any one of (2) to (4), in which
    the display control unit causes the transition screen to be displayed for 500 milliseconds or more.

(6) The information processing device according to any one of (1) to (5), in which the display control unit toggles whether or not to start the authentication process on a basis of the operation information.
(7) The information processing device according to (6), in which
the display control unit toggles whether or not to start the authentication process on a basis of a touch position on a display screen that displays the lock screen, a direction of a touching finger, a touch surface area, or a number of touches.
(8) The information processing device according to (7), in which
the authentication process is executed on a basis of biometric information obtained from a finger that touches the display screen that displays the lock screen.
(9) The information processing device according to any one of (1) to (8), in which
the display control unit causes the lock screen or the initial screen to be displayed in a case in which certain operation information is obtained while the return screen is being displayed.
(10) An information processing device, including:
an acquisition unit that acquires authentication information and operation information; and
a display control unit that controls a display on a basis of the authentication information or the operation information acquired by the acquisition unit, in which
the display control unit
causes a lock screen to be displayed in a case in which certain operation information is acquired while an initial screen is being displayed,
causes an unlocked return screen to be displayed in a case in which the authentication information indicating that authentication is successful is acquired, and
causes an image based on the lock screen to be displayed on the return screen.
(11) The information processing device according to (10), in which
the image based on the lock screen includes information displayed on the lock screen.
(12) The information processing device according to (11), in which
the image based on the lock screen is a reduced image of the lock screen.
(13) The information processing device according to (12), in which
the display control unit causes the lock screen to be displayed in a case in which the operation information indicating a certain operation on the reduced image of the lock screen is obtained.
(14) The information processing device according to any one of (11) to (13), in which
the display control unit causes the image based on the lock screen to be displayed overlaid onto the return screen.
(15) The information processing device according to (14), in which
the display control unit causes the image based on the lock screen to be displayed transparently.
(16) The information processing device according to any one of (11) to (15), in which
the display control unit controls a display in accordance with operation information indicating an operation on the image based on the lock screen.
(17) The information processing device according to any one of (11) to (16), in which the display control unit controls a display of the image based on the lock screen in accordance with content of the return screen.
(18) The information processing device according to any one of (11) to (17), in which
the display control unit controls a layout of the return screen in accordance with the image based on the lock screen.
(19) An information processing method, including:
acquiring authentication information and operation information; and
controlling a display with a processor on a basis of the acquired authentication information or the acquired operation information, in which
the controlling of the display includes
causing a lock screen to be displayed in a case in which certain operation information is acquired while an initial screen is being displayed,
causing an unlocked return screen to be displayed in a case in which an authentication process based on the authentication information is successful, and
controlling, on a basis of the operation information, a transition from the lock screen to the return screen conducted in accordance with the authentication process.
(20) An information processing method, including:
acquiring authentication information and operation information; and
controlling a display with a processor on a basis of the acquired authentication information or the acquired operation information, in which
the controlling of the display includes
causing a lock screen to be displayed in a case in which certain operation information is acquired while an initial screen is being displayed,
causing an unlocked return screen to be displayed in a case in which the authentication information indicating that authentication is successful is acquired, and
causing an image based on the lock screen to be displayed on the return screen.

What is claimed is:
1. An information processing device, comprising:
processing circuitry configured to
acquire authentication information and operation information;
control a display on a basis of the authentication information or the operation information acquired by the processing circuitry;
cause a lock screen to be displayed in a case in which first operation information is acquired while an initial screen is being displayed;
cause an unlocked return screen to be displayed in a case in which an authentication process based on the authentication information is successful; and
control, on a basis of the operation information, a transition from the lock screen to the unlocked return screen conducted in accordance with the authentication process, wherein
the processing circuitry is further configured to
continue to cause a transition screen indicating an ongoing transition from the lock screen to the unlocked return screen to be displayed during an execution period of the authentication process and another period continuous with the execution period; and cancel the transition from the lock screen to the unlocked return screen and cause the lock screen to be displayed again in a case in which second operation information is obtained while the transition screen is being displayed, wherein
the processing circuitry is configured to continue to cause the transition screen to be displayed even after an end of the execution period of the authentication process, and
the processing circuitry is configured to cancel the transition in response to obtaining the second operation information even in a case in which the second operation information is obtained after the end of the execution period of the authentication process as long as the second operation information is obtained during the another period continuous with the execution period.

2. The information processing device according to claim 1, wherein
the processing circuitry controls a display period of the transition screen.

3. The information processing device according to claim 2, wherein
the processing circuitry controls a display period of the transition screen in accordance with an operation history of a user.

4. The information processing device according to claim 1, wherein
the processing circuitry causes the transition screen to be displayed for 500 milliseconds or more.

5. The information processing device according to claim 1, wherein
the processing circuitry toggles whether or not to start the authentication process on a basis of the operation information.

6. The information processing device according to claim 5, wherein
the processing circuitry toggles whether or not to start the authentication process on a basis of a touch position on a display screen that displays the lock screen, a direction of a touching finger, a touch surface area, or a number of touches.

7. The information processing device according to claim 6, wherein
the authentication process is executed on a basis of biometric information obtained from a finger that touches the display screen that displays the lock screen.

8. The information processing device according to claim 1, wherein
the processing circuitry causes the lock screen or the initial screen to be displayed in a case in which third operation information is obtained while the unlocked return screen is being displayed.

9. The information processing device according to claim 1, wherein
the second operation information is a cancel operation to cancel the transition from the lock screen to the unlocked return screen.

10. An information processing device, comprising:
processing circuitry configured to
acquire authentication information and operation information;
control a display on a basis of the authentication information or the operation information acquired by the processing circuitry;
cause a lock screen to be displayed in a case in which certain operation information is acquired while an initial screen is being displayed;
cause an unlocked return screen to be displayed in a case in which the authentication information indicating that authentication is successful is acquired; and
cause an image based on the lock screen to be displayed on the unlocked return screen, wherein
the image based on the lock screen includes information displayed on the lock screen,
the image based on the lock screen is a reduced image of the lock screen, the reduce image being obtained by reducing a size of an entire area of the lock screen, the reduce image having same and all contents of the lock screen, and
the processing circuitry is configured to cause the reduced image to be overlaid on a part of the unlocked return screen.

11. The information processing device according to claim 10, wherein
the processing circuitry causes the lock screen to be displayed in a case in which the operation information indicating a certain operation on the reduced image of the lock screen is obtained.

12. The information processing device according to claim 10, wherein
the processing circuitry causes the image based on the lock screen to be displayed overlaid onto the unlocked return screen.

13. The information processing device according to claim 12, wherein
the processing circuitry causes the image based on the lock screen to be displayed transparently.

14. The information processing device according to claim 10, wherein
the processing circuitry controls a display in accordance with operation information indicating an operation on the image based on the lock screen.

15. The information processing device according to claim 10, wherein
the processing circuitry controls a display of the image based on the lock screen in accordance with content of the unlocked return screen.

16. The information processing device according to claim 10, wherein
the processing circuitry controls a layout of the unlocked return screen in accordance with the image based on the lock screen.

17. An information processing method, comprising:
acquiring authentication information and operation information; and
controlling a display with a processor on a basis of the acquired authentication information or the acquired operation information, wherein
the controlling of the display includes
causing a lock screen to be displayed in a case in which first operation information is acquired while an initial screen is being displayed;
causing an unlocked return screen to be displayed in a case in which an authentication process based on the authentication information is successful;
controlling, on a basis of the operation information, a transition from the lock screen to the unlocked return screen conducted in accordance with the authentication process;

continuing to cause a transition screen indicating an ongoing transition from the lock screen to the unlocked return screen to be displayed during an execution period of the authentication process and another period continuous with the execution period; and canceling the transition from the lock screen to the unlocked return screen and causing the lock screen to be displayed again in a case in which second operation information is obtained while the transition screen is being displayed, wherein the continuing continues to cause the transition screen to be displayed even after an end of the execution period of the authentication process, and the canceling cancels the transition in response to obtaining the second operation information even in a case in which the second operation information is obtained after the end of the execution period of the authentication process as long as the second operation information is obtained during the another period continuous with the execution period.

18. An information processing method, comprising:

acquiring authentication information and operation information; and controlling a display with a processor on a basis of the acquired authentication information or the acquired operation information, wherein the controlling of the display includes causing a lock screen to be displayed in a case in which certain operation information is acquired while an initial screen is being displayed;

causing an unlocked return screen to be displayed in a case in which the authentication information indicating that authentication is successful is acquired; and causing an image based on the lock screen to be displayed on the unlocked return screen, the image based on the lock screen includes information displayed on the lock screen, the image based on the lock screen is a reduced image of the lock screen, the reduce image being obtained by reducing a size of an entire area of the lock screen, the reduce image having same and all contents of the lock screen, and the controlling of the display further includes causing the reduced image to be overlaid on a part of the unlocked return screen.

* * * * *